United States Patent [19]

Tseng

[11] Patent Number: 5,437,205
[45] Date of Patent: Aug. 1, 1995

[54] WRAP SPRING CLUTCHES TYPE TRANSMISSION SYSTEM

[76] Inventor: Sheng-Tsai Tseng, No.5-3,Chia An W. Rd.,Chia An Tsun, Long Tang Hsian, Taoyuan Hsien, Taiwan

[21] Appl. No.: 181,585

[22] Filed: Jan. 14, 1994

[51] Int. Cl.6 .............................................. F16H 3/08
[52] U.S. Cl. .................................... 74/359; 192/41 S; 475/198
[58] Field of Search ............... 74/330, 359; 192/48.92, 192/41 S; 475/198

[56] References Cited

U.S. PATENT DOCUMENTS

| | | | |
|---|---|---|---|
| 4,270,637 | 6/1981 | Lowery | 192/41 S |
| 5,000,057 | 3/1991 | Tseng | 74/359 |
| 5,029,689 | 7/1991 | Grimm | 192/41 S |
| 5,341,698 | 8/1994 | Tseng | 74/359 |

Primary Examiner—Dirk Wright
Assistant Examiner—Khoi Q. Ta
Attorney, Agent, or Firm—Bacon & Thomas

[57] ABSTRACT

A car transmission system which employs gear sets for transmission and is free from clutch mechanism. The transmission system mainly includes several driving gears which have increasing numbers of teeth and are sequentially inter-fitted on a driving shaft from inner side to outer side at intervals, and several driven gears which have decreasing numbers of teeth and are sequentially inter-fitted on a driven shaft from outer side to inner side at intervals. The driven gears are constantly engaged with the corresponding driving gears. The transmission spring members are controlled by a manually operated or automatically operated transmission controlling assembly and are respectively reciprocally independently moved between an engaging position where the power is transmitted and a disengaging position where the power is not transmitted, whereby the power of the driving shaft is sequentially transmitted to any of the driving gears. Several one-way coil spring transmission members are disposed between the adjacent driven; gears and driven shaft for sequentially transmitting the power of the respective driven gears to the driven shaft and allowing the inward driven gear to rotate at a speed not lower than that of the outward driven gear. The power of the driven shaft is transmitted to a differential housing through a torque adjusting means which delays the transmission of power and stores a greater torque.

6 Claims, 24 Drawing Sheets

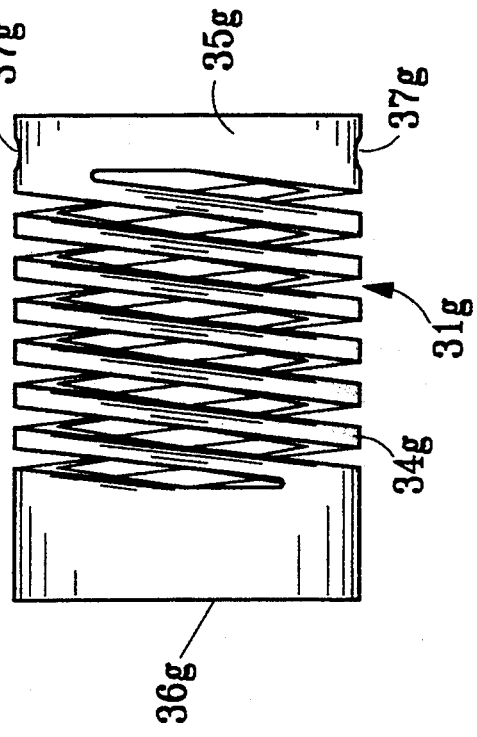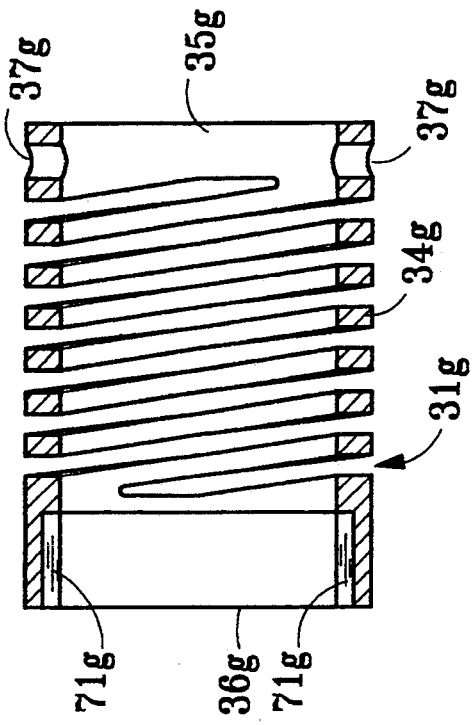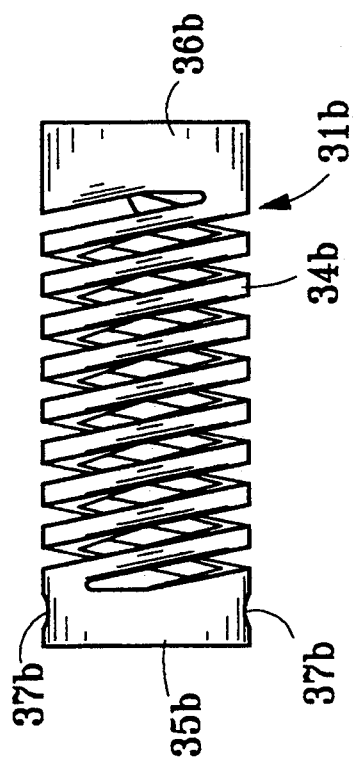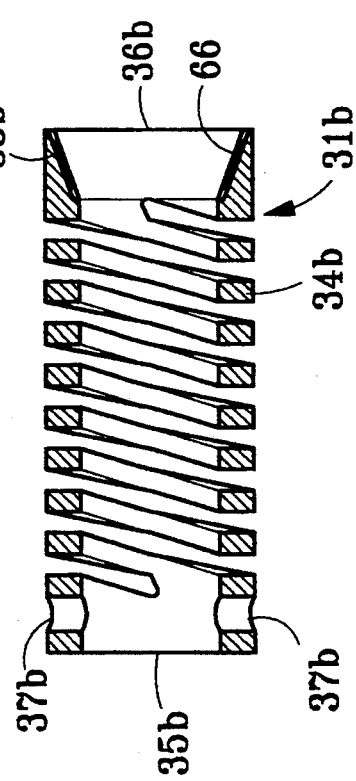

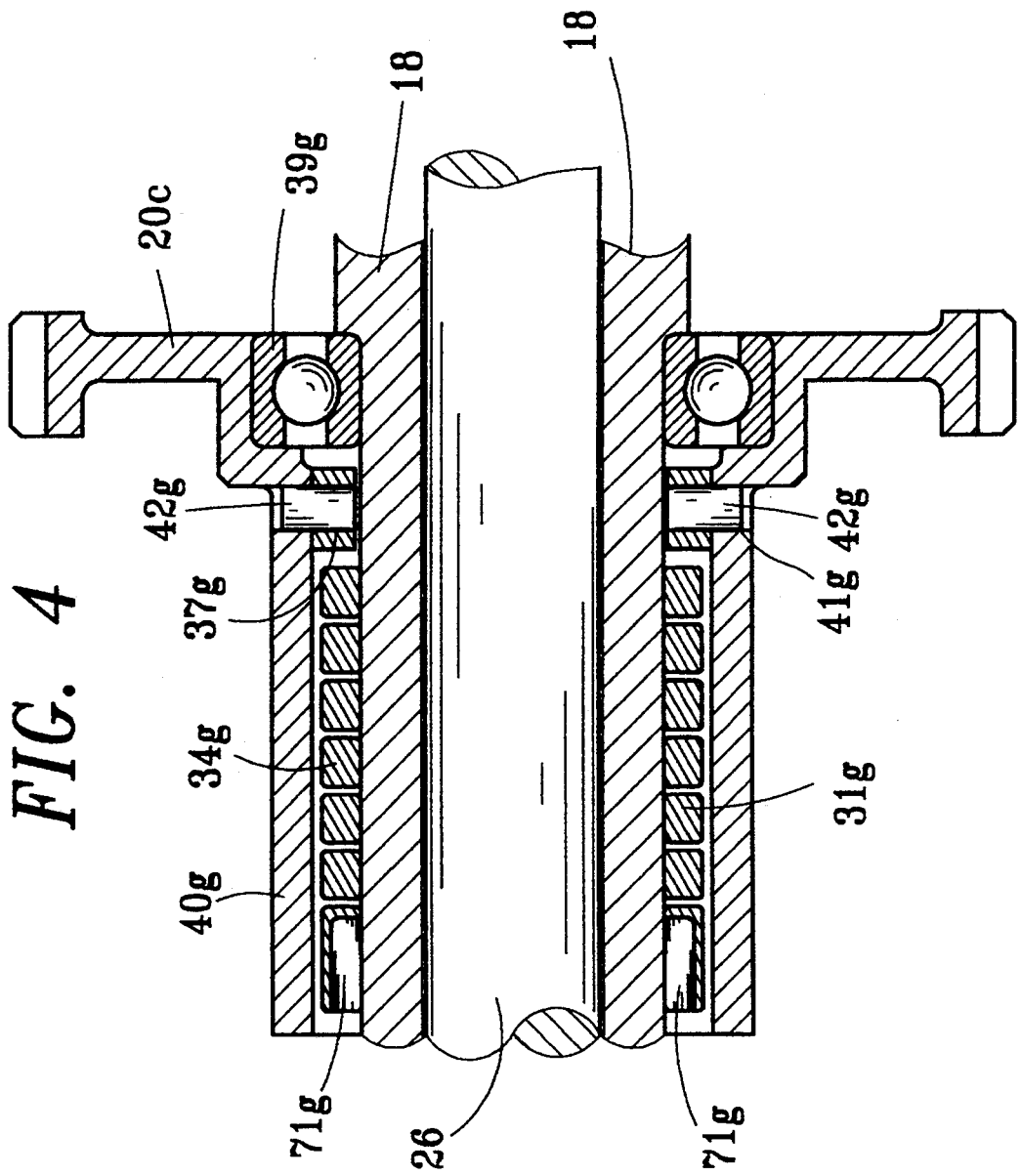

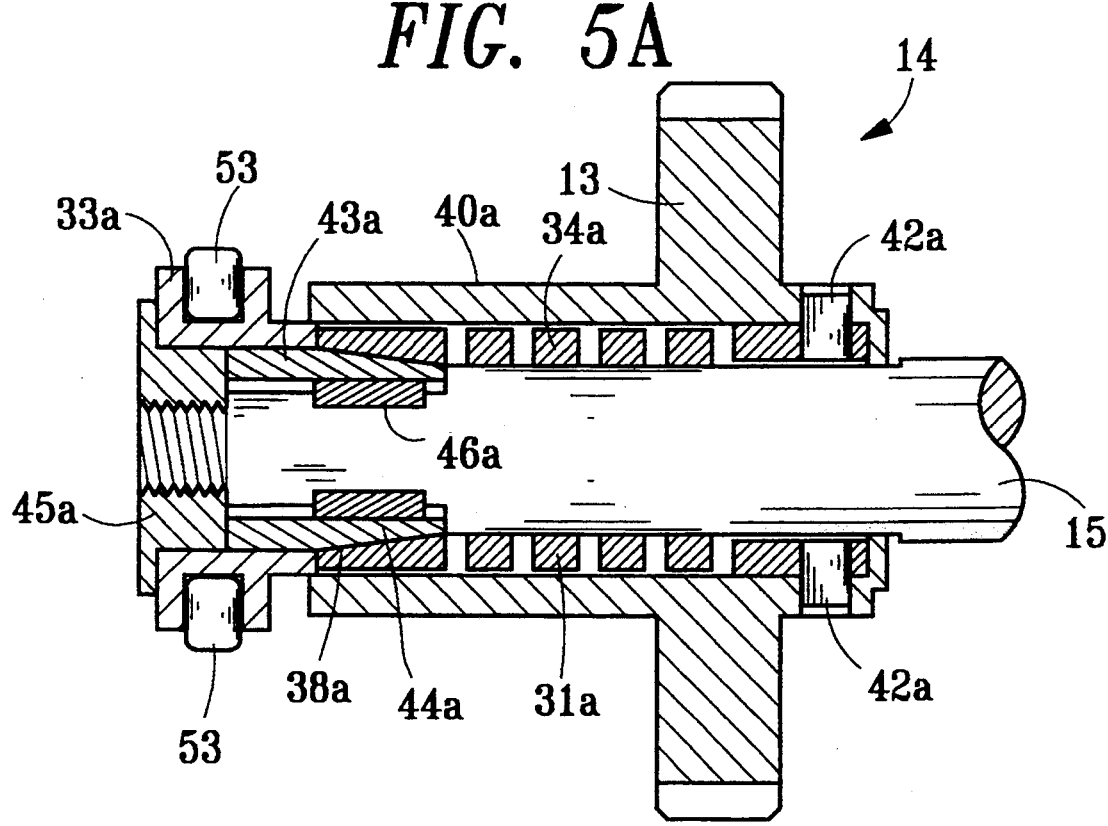
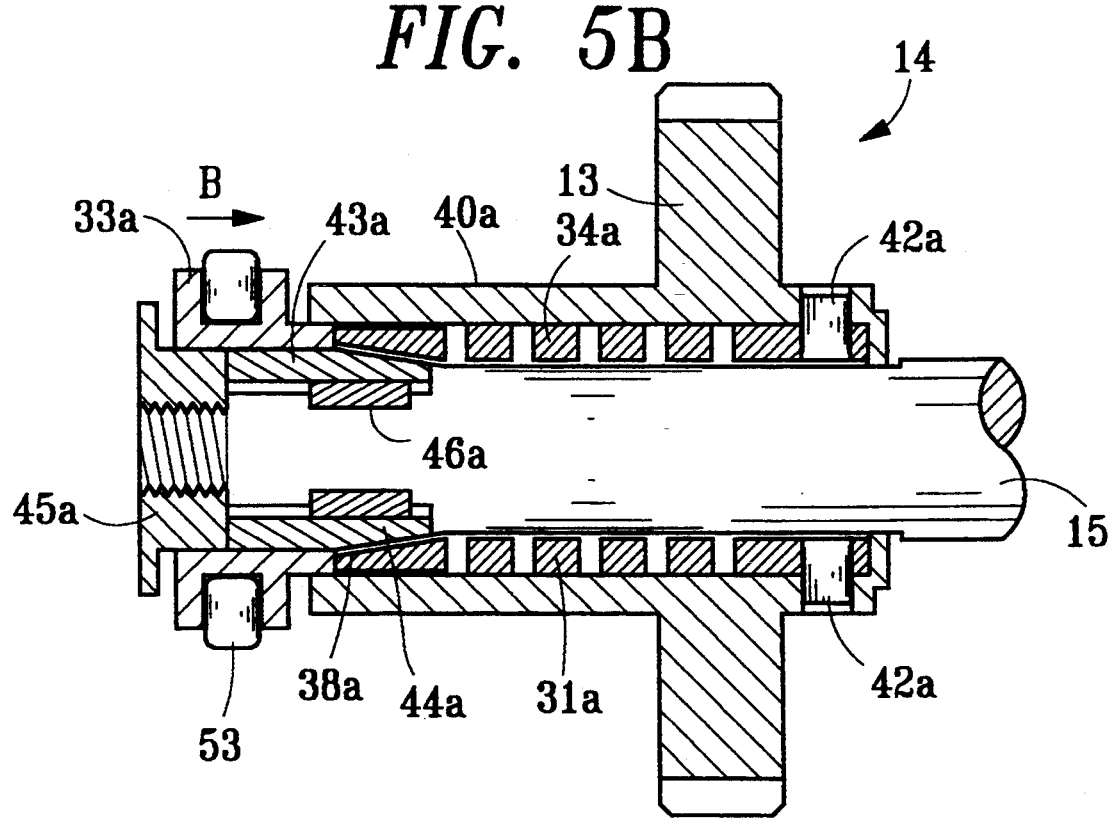

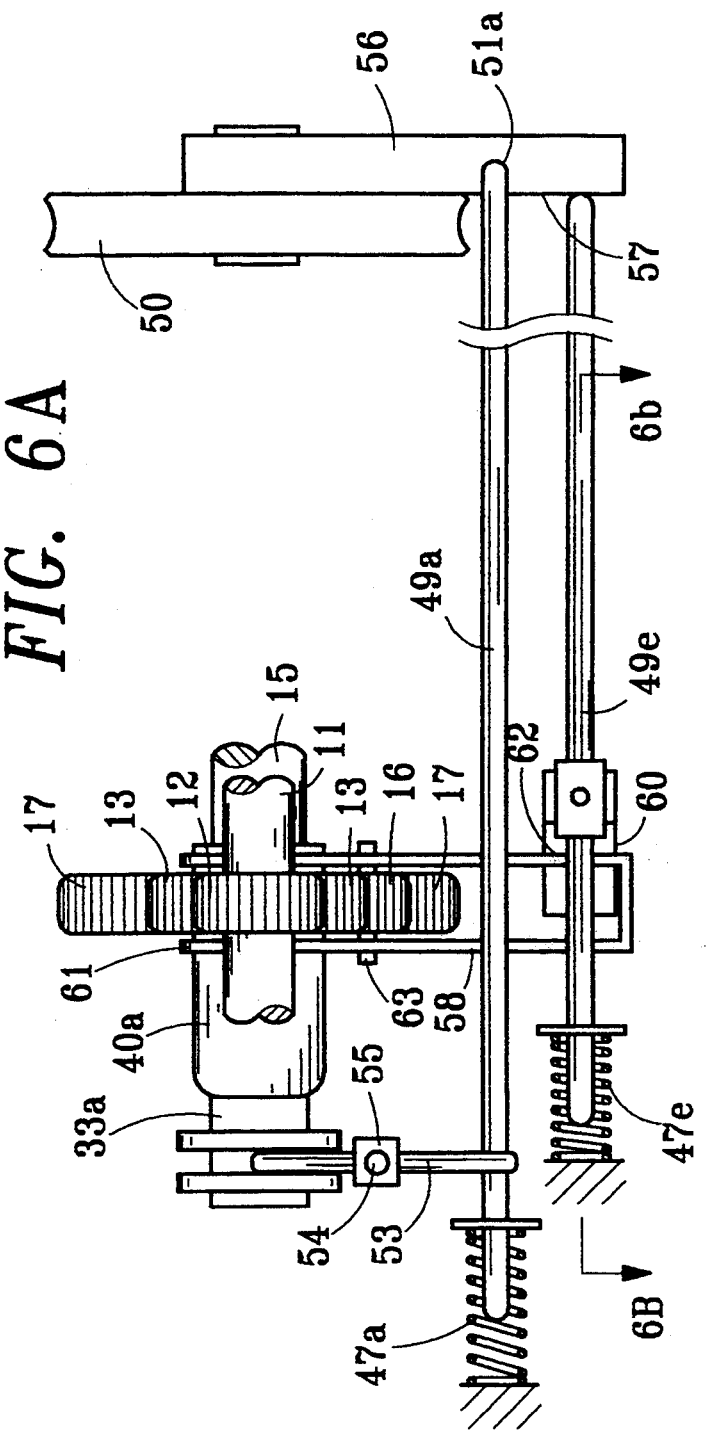
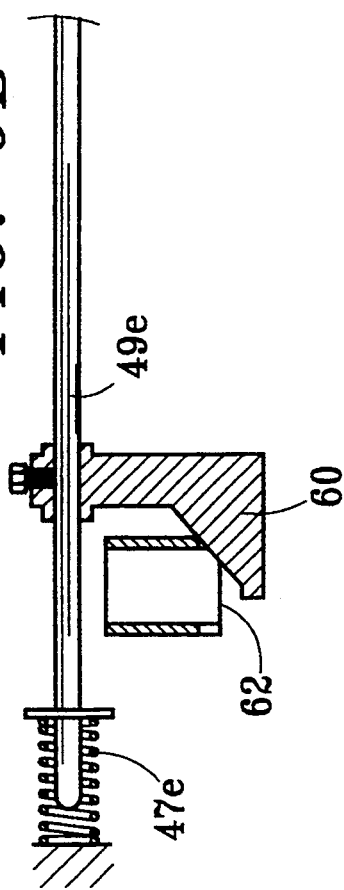

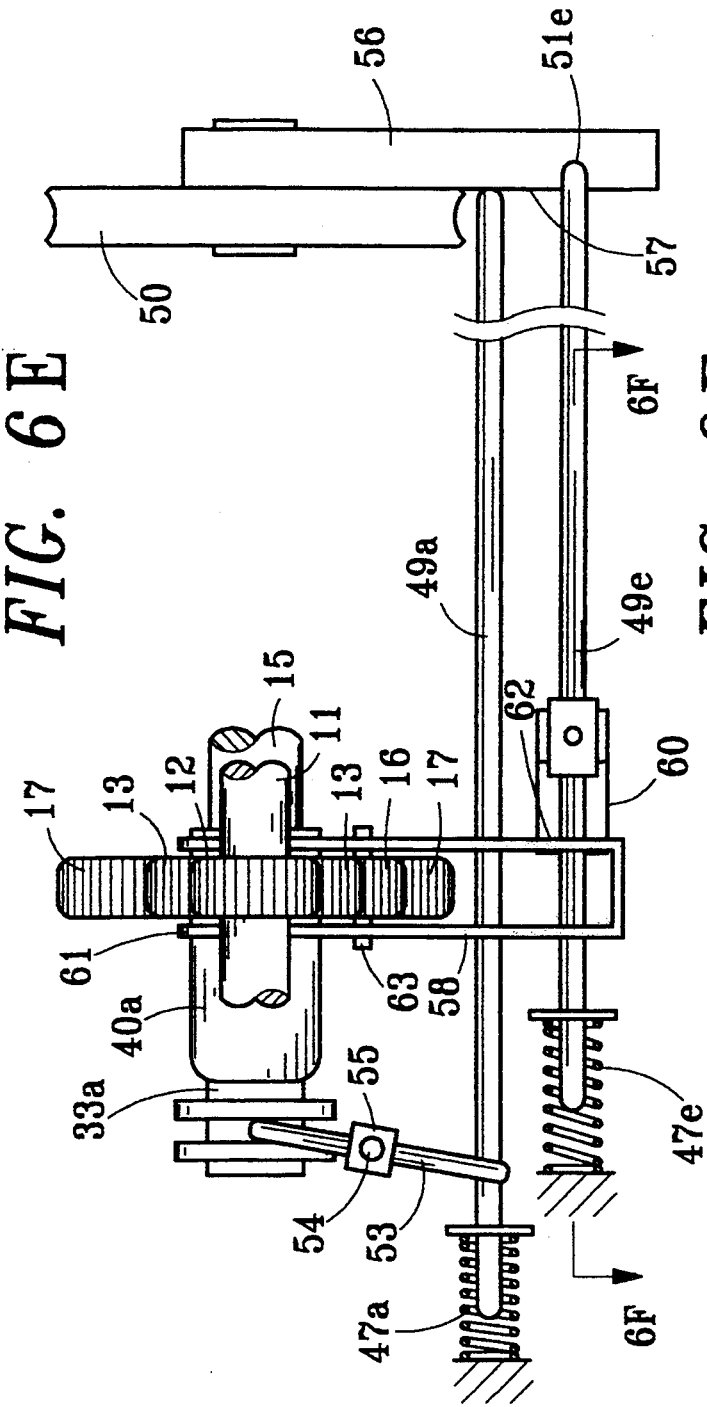
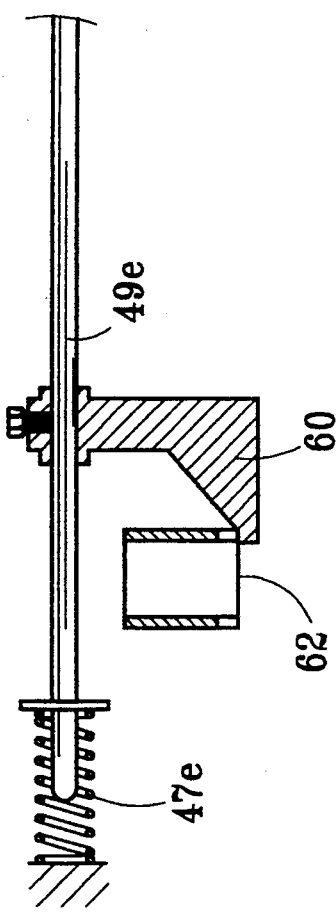
FIG. 6E
FIG. 6F

WRAP SPRING CLUTCHES TYPE TRANSMISSION SYSTEM

BACKGROUND OF THE INVENTION

The present invention relates to a car transmission system, and more particularly to a car transmission system which has enhanced transmission efficiency and reduced volume.

Conventional car transmission systems can be generally divided into manually operated transmission system, automatically operated transmission system and continuously variable transmission system.

The manually operated transmission system employs gear sets with different gear ratios for transmitting power and has better transmission efficiency. However, when driving a car with manually operated transmission system, a driver must frequently step and release the clutch pedal and shift the gear lever according to the running speed and road condition for changing the transmission ratios and transmission torque. Such procedures consume the driver's physical and mental energy. Especially, when the traffic condition is complex or to a driver not skilled in the driving, the shifting movement may disable the driver from concentrating on the driving and thus cause accident.

The automatically operated transmission can eliminate the troublesome procedures of stepping and releasing the clutch pedal and shifting the gear lever. However, because the automatically operated transmission employs a fluid as the medium for transmitting the power of the engine and a power transmission delay phenomenon occurs at two ends of the fluid torque changing device, the efficiency is not desirable. This results in that the automatic transmission car is more fuel-consuming than the manual transmission car and the acceleration/deceleration of the automatic transmission car is more obtuse than the manual transmission car. In addition, the braking frequency of the automatic transmission car is higher and the wear of the brake thereof is greater.

The continuously variable transmission is composed of a belt and a pair of pulleys connected therewith. A very great transmission torque is created between the belt and the pulleys. The axial force exerted on the belt incurs a very great compression force on the triangular belt, so that the thickness of the belt must be considerably large for avoiding axial break or damage thereof. When the thickness of the belt is increased, the centrifugal force thereof is correspondingly increased. This results in greater tension load of the belt. In addition, when the thickness of the belt is increased, an even greater stress is exerted on the pulleys so that the dimension thereof must be enlarged. Moreover, the triangular belt must be continuously pulled out of the compression grooves of the two pulleys, so that the wear loss and dullness of the belt will be apparently caused. This negatively affect the efficiency and using life of the continuously variable transmission system.

SUMMARY OF THE INVENTION

It is a primary object of the present invention to provide a car transmission system which has enhanced transmission efficiency and reduced volume. This transmission system possesses the advantages of the above-mentioned conventional transmission systems.

It is a further object of the present invention to provide the above car transmission system in which the transmission ratios can be changed in manually operating manner or automatically operating manner.

It is still a further object of the present invention to provide the above car transmission system which includes a fully meshing gear type transmission mechanism with the characters of one-way transmission and differential transmission, whereby without the clutching operation of a clutch, the gear lever is operated to directly accomplish the transmission between the transmission gear sets. Moreover, by means of less transmission gear sets, more different transmission ratios are obtained for selection. For example, if four transmission gear sets are provided, then eight kinds of transmission ratios can be obtained, while if five transmission gear sets are provided, then 16 kinds of transmission ratios can be achieved.

It is still a further object of the present invention to provide the above car transmission system which includes a torque adjusting means, whereby when the car starts to run, the car wheel shafts obtain a greater initial torque and the vibration of the engine and car body during transmission is reduced.

It is still a further object of the above car transmission system which possesses both the better transmission efficiency of the gear transmission and the operational convenience as achieved by an automatic transmission case.

According to the above objects, the transmission system of the present invention includes a pre-reducing mechanism, a running mode controlling device, a transmission mechanism, a differential and a torque adjusting means.

By means of the running mode controlling device, a driver can select in manually operating manner to solely transmit the power of the engine shaft to a driving shaft of the transmission mechanism, making the car run forward by different transmission ratios. Alternatively, the driver can select to solely transmit the power of the engine shaft to a backward gear through an idle, making the car backward run by a fixed transmission ratio. Alternatively, the driver can select not to transmit the power of the engine shaft to the driving shaft or the backward gear, making the engine shaft idle and making the car remain still.

The transmission mechanism mainly includes several transmission gear sets with different transmission ratios and a transmission controlling assembly. Each transmission gear set is composed of several driving gears with gradually increasing numbers of teeth and several driven gears with gradually decreasing numbers of teeth. The driving gears are constantly engaged with the driven gears. The first driving gear is directly rotarily driven by the driving shaft, while the other driving gears are inter-fitted on the driving shaft in sequence at equal intervals. By means of several transmission spring members disposed between the respective driving gears, the power of the driving shaft is transmitted through the driving gears in sequence. The respective driven gears are inter-fitted on a driven shaft in sequence at equal intervals. By means of several transmission spring members disposed between the driven gears, the power is transmitted in sequence to the driven shaft. The transmission spring member is substantially a coil spring which has the characters of one-way and differential transmission, whereby a high speed level driven gear is allowed to rotate at a speed higher than or equal to that of a low speed level driven gear.

The transmission controlling assembly can be manually operated or automatically operated to optionally solely or simultaneously push any of the transmission spring members disposed between the driving gears so as to solely or simultaneously interrupt the power transmission state between any two adjacent driving gears, so that the driving shaft is able to indirectly drive the driven shaft to rotate at different transmission ratios.

The torque adjusting means mainly includes a housing integrally connected with the driven shaft, a torque adjusting ring and a spring. The housing is formed with inner coil guide groove and the torque adjusting ring is formed with outer coil projection corresponding to the coil guide groove, whereby when the housing rotates along with the driven shaft, the torque adjusting ring meshing with the coil guide groove is driven to rotate synchronously with the housing or linearly slide along the coil guide groove. The torque adjusting ring is linearly slidably connected with the housing of the differential and suffers the pushing force of the spring, whereby when the housing of the torque adjusting means is initially rotarily driven or when the transmission ratios of the transmission mechanism are changed, the load from the differential housing is greater than the resilient force of the spring and thus when the torque adjusting ring linearly moves in a forced direction of the spring along the coil guide groove. At this time, the torque adjusting ring slides relative to the differential housing without transmitting the power. Until the load from the differential housing and the reaction force of the forced spring exerted on the torque adjusting ring come to a balance-state. At this time, the torque adjusting ring is unable to further force the spring and immediately stops linearly sliding and turns to rotate synchronously with the housing of the torque adjusting means, whereby the rotating power thereof is transmitted to the differential housing, making the same rotate synchronously with the housing of the torque adjusting means.

The present invention can be best understood through the following description and accompanying drawing, wherein:

BRIEF DESCRIPTION OF THE DRAWINGS

FIGS. 2A and 2B respectively are enlarged front and axially sectional views of the coil spring transmission member disposed between the driving shaft and each driving gear of the present invention;

FIGS. 2C and 2D respectively are enlarged front and axially sectional views of the coil spring transmission member disposed between the driven shaft and each driven gear of the present invention;

FIG. 4 is an enlarged sectional assembled view of the driven shaft, driven gears and coil spring transmission members of the transmission system of the present invention;

FIGS. 5A and 5B are enlarged axially sectional views respectively showing the idling controlling assembly of the running mode controlling device of the present invention in the forward running mode and idling mode;

FIG. 6A is a front view of the running mode controlling device in the forward running mode;

FIG. 6B is a sectional view taken along line 6B—6B of FIG. 6A;

FIG. 6E is a front view of the running mode controlling device in the backward running mode;

FIG. 6F is a sectional view taken along line 6F—6F of FIG. 6E;

DETAILED DESCRIPTION OF THE PREFERRED EMBODIMENT

Figure 1:
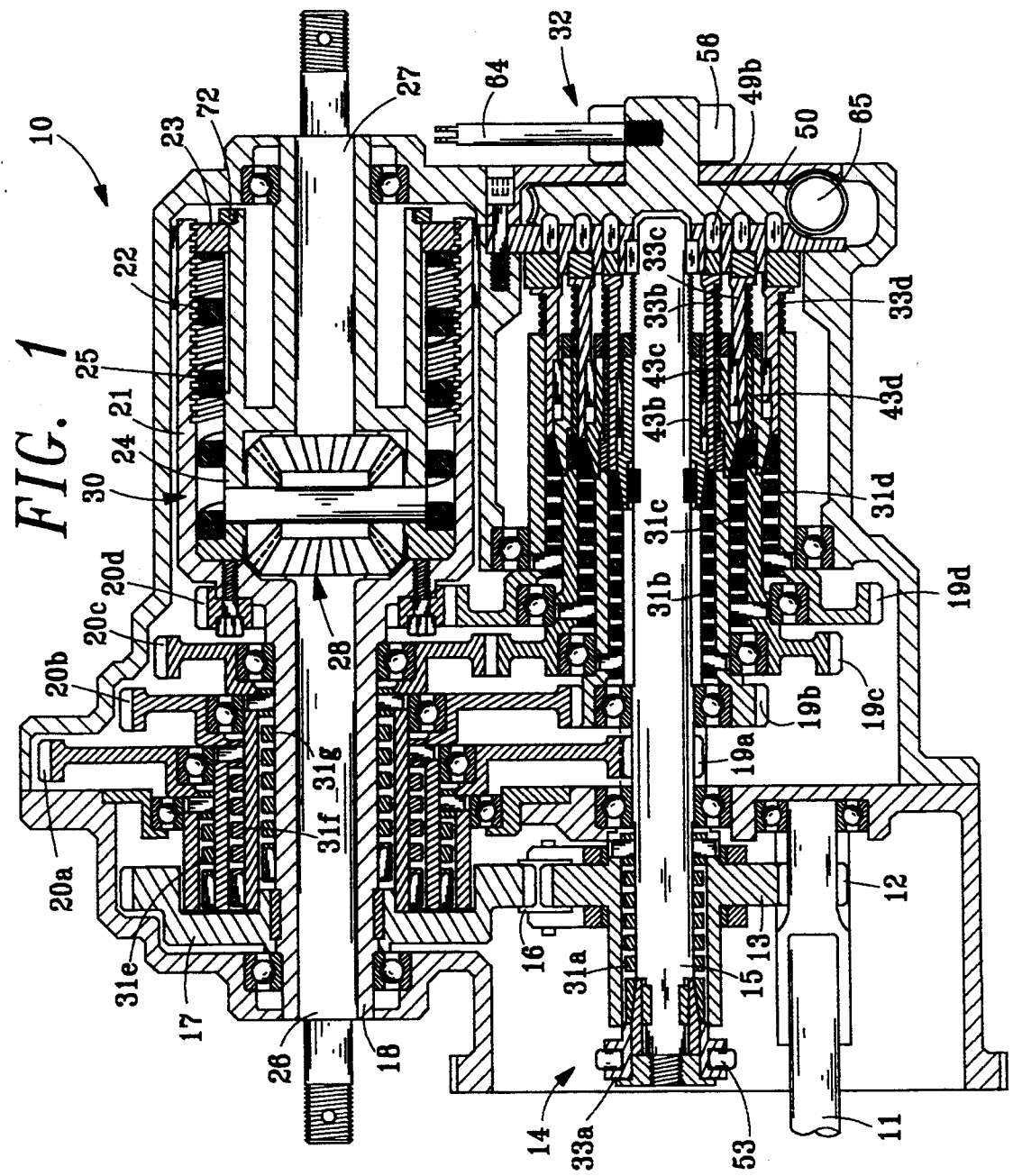
FIG. 1 is a sectional view of the car transmission system of the present invention.

Please refer to FIG. 1. The car transmission system 10 of the present invention includes a pre-reducing mechanism, a running mode controlling device, a transmission mechanism, a differential and a torque adjusting means, wherein an engine shaft 11 is rotarily driven by a power source such as an internal combustion engine (not shown). The power of the engine shaft 11 is transmitted to the running mode controlling device 14 by a pre-reducing gear set 12, 13 and is controllably optionally further transmitted to a driving shaft 15 of the-transmission mechanism according to the desire of a driver, making the car run forward by different transmission ratios. Alternatively, the power of the engine shaft 1 is optionally further transmitted to a backward gear 17 through an idle 16. The backward gear 17 is able to directly drive a driven shaft 18 of the transmission mechanism, making the car backward run by a fixed transmission ratio. Alternatively, the transmission of the power can be optionally interrupted, i.e., the power is not transmitted to the driving shaft 15 or the backward gear 17, making the car remain still during the running of the internal combustion engine. When the driver selects to further transmit the power of the power source to the driving shaft 15 of the transmission mechanism and make the car keep running forward, the power of the driving shaft 15 is transmitted to the driven shaft 18 through several transmission gear sets with different gear ratios. The transmission gear set is composed of several driving gears 9a to 19d with gradually increasing numbers of teeth and several driven gears 20a to 20d with gradually decreasing numbers of teeth. The driving gears 19a to 19d are constantly engaged with the driven gears 20a to 20d, wherein by means of a manually operated or automatically operated transmission controlling assembly 32, the power can be directly or indirectly inter-transmitted between the driving shaft 15 and two adjacent driving gears 19a to 19d, while the two adjacent driven gears 20a to 20 are constantly engaged with the driving gears with the power differentially directly transmitted in one direction, whereby for example, a low speed driven gear of the first driven gear 20a is allowed to rotate at a speed lower than or equal to the speed of a high speed driven gear of, for example, the second driven gear 20b. The driven shaft 18 is substantially integrally connected with a housing 21 of the torque adjusting means 30 so as to synchronously rotate therewith. Also, by means of the torque adjusting and buffering effects of the torque adjusting means 30, the torque output curve thereof can be improved, whereby when the car starts to run or change the transmission ratios, the two lateral wheel shafts 26, 27 driven through the torque adjusting means 30 and parachute differential gear set 28 can not only obtain greater initial torque but also reduce the vibration of the engine and the car body during transmission. As a result, the car can run in a more stable and comfortable condition.

The above power transmission relationship can be better understood by means of referring to the power transmission path shown in FIGS. 9A to 9J. When one backward gear set 16 and 17 and four forward transmission gear sets 19a to 19d and 20a to 20d are provided in the present invention, in addition to the conventional idling and backward running mode, the transmission system 10 of the present invention provides eight forward transmission ratios for selection. Compared with the conventional four transmission ratios provided by the traditional transmission system having four transmission gear sets, the present invention has wider application range. In case the number of the forward transmission gear sets of the present invention is "n", then $2^{n-1}$ kinds of forward transmission ratios are available. For example, if five forward transmission gear sets are provided, then 16 kinds of forward transmission ratios are obtained. In contrast to the present invention, the conventional transmission system with "n" forward transmission gear sets can only obtain "n" kinds of forward transmission ratios.

The transmission mechanism of the present invention mainly includes the driving shaft 15 rotarily driven by the engine shaft 11, several transmission gear sets composed of constantly engaged driving gears 19a, 19b, 19c and 19d and corresponding driven gears 20a, 20b, 20c and 20d, and the driven shaft 18 driven by different transmission ratios through the several transmission gear sets. For simplifying the construction of the transmission system of the present invention and reducing the volume thereof, the first driving gear 19a is directly fixed on the driving shaft 15 to rotate synchronously therewith and the fourth driven gear 20d is directly fixed on the driven shaft 18 or the housing 21 of the torque adjusting means which is integrally connected with the driven shaft 18. Such connection will not affect the aforesaid and hereinafter described each item of the present invention and the function thereof. On the other hand, between the second driving gear 19b and driving shaft 15 and the two adjacent second to fourth driving gears 19b, 19c and 19d are respectively disposed detachable coil spring transmission members 31b, 31c and 31d, whereby the power of the driving shaft 15 is transmitted in sequence to the second, third and fourth driving gears 19b, 19c and 19d, making the same synchronously rotate with the driving shaft 15. However, the transmission members 31b, 31c and 31d can be pushed away respectively by a second to a fourth controlling pushing sleeves 33b, 33c and 33d to a separating position where the power transmission is interrupted, whereby sequential direct power transmission of the driving shaft 15 to the second to fourth driving gears 19b, 19c and 19d is interruptible by any of the transmission members 31b, 31c and 31d. Moreover, between two adjacent first to third driven gears 20a, 20b and 20c and the third driven gear 20c and the driven shaft 18 are respectively disposed undetachable coil spring transmission members 3e, 31f and 31g, whereby the transmission members 31e, 31f and 31g in sequence transmit the power of the first to third driven gears 20a, 20b and 20c to the driven shaft 18. Because the rotating direction of the respective driven gears 20a to 20d and the driven shaft 18 is the same as that of the respective coil spring transmission members 31e, 31f and 31g, and the coil spring transmission members 31e, 31f and 31g have the characters of one-way transmission and differential transmission, during the power transmission procedure from the first driven gear 20a to the driven shaft 18, the driven shaft 18 or the high speed driven gear is allowed to rotate at a speed higher than or equal to that of the low speed driven gear. For example, when the second driven gear 20b is solely driven by the first driven gear 20a through the fifth coil spring transmission member 31e, and the second driven gear 20b suffers no other driving force, the second driven gear 20b and the first driven gear 20a rotate at the same speed. However, when the power of the driving shaft 15 is directly transmitted to the second driving gear 19b through the second coil spring transmission member 31b, the second driven gear 20b is simultaneously driven by the first driven gear 20a and the second driving gear 19b with different gear ratios, whereby the second driven gear 20b is rotated at a speed higher than that of the first driven gear 20a.

Figure 3A:
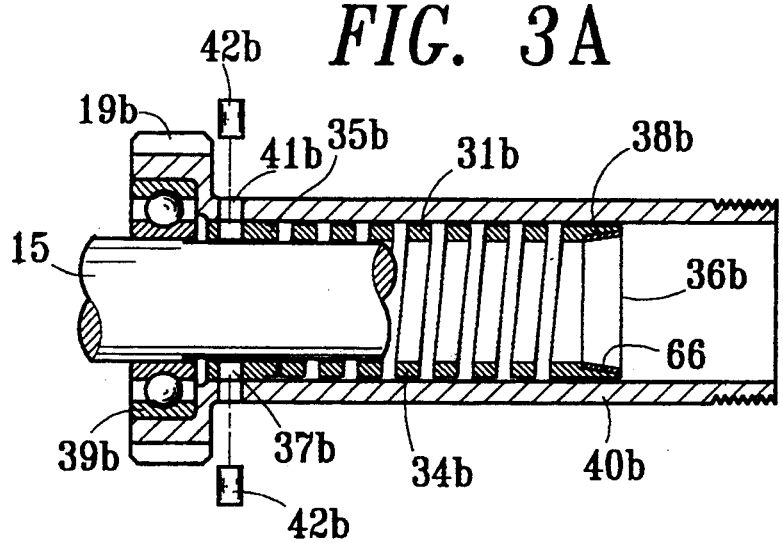
FIGS. 3A to 3E respectively are enlarged axially sectional views of the driving shaft, driving gears, coil spring transmission members and controlling pushing sleeves of the transmission system of the present invention during each assembling step.
Figure 3B:
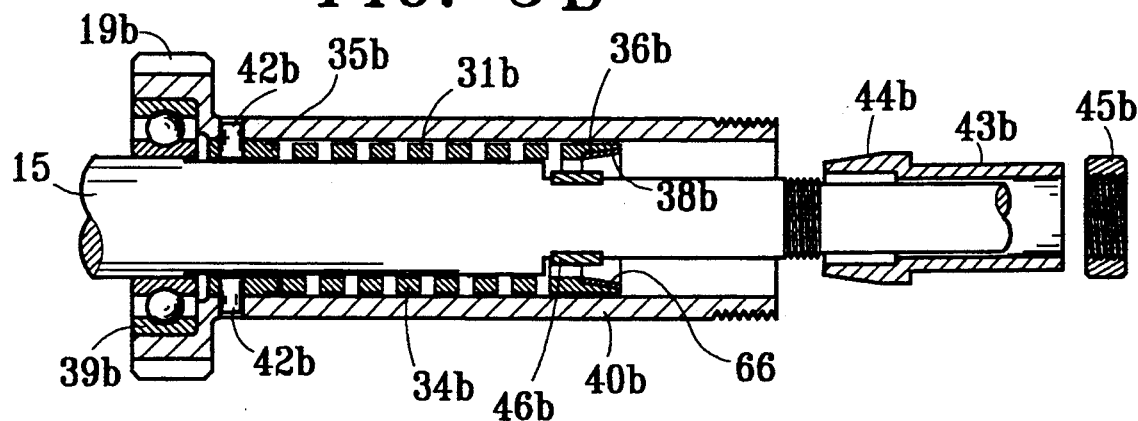
Figure 3C:
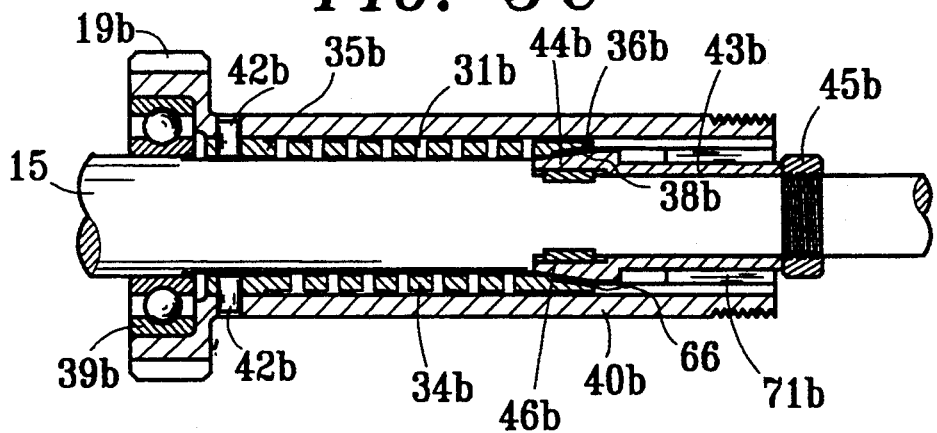
Figure 3D:
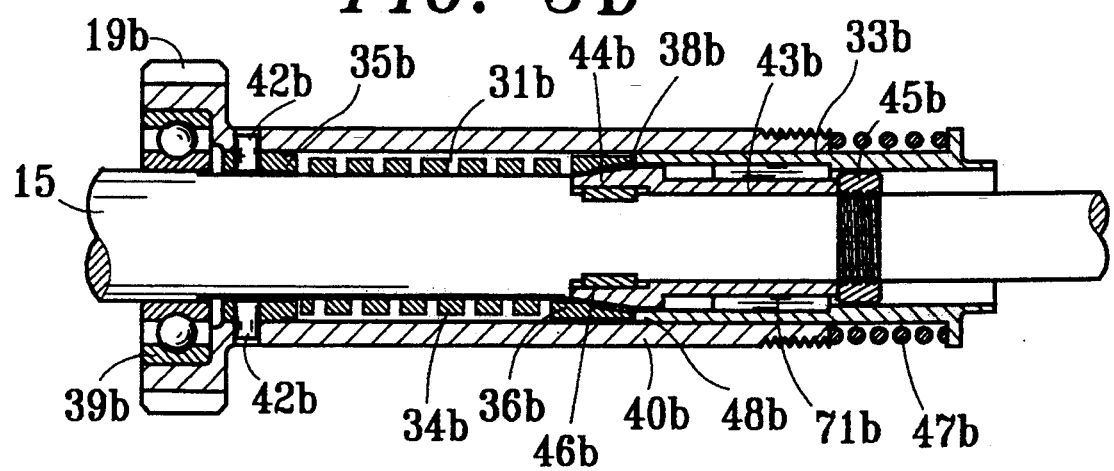
Figure 3E:
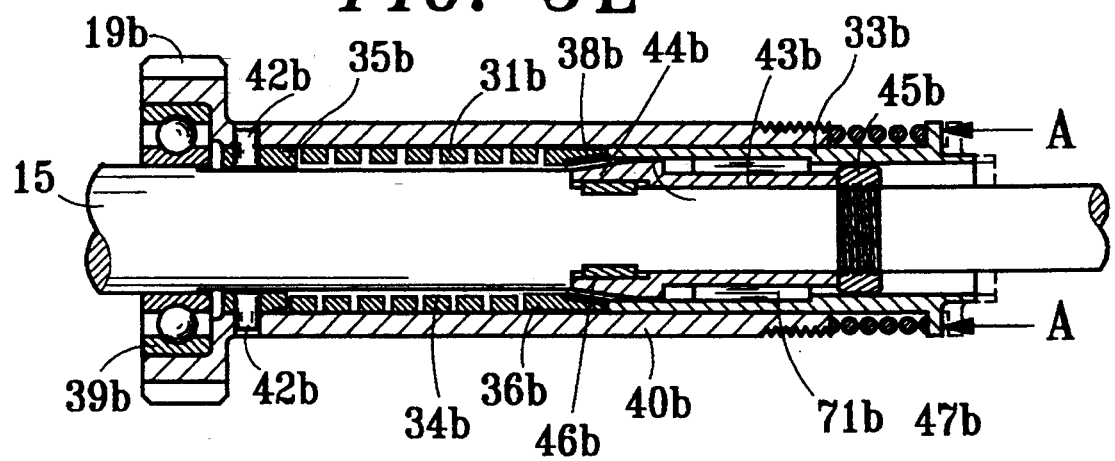

The above second coil spring transmission member 31b disposed between the second driving gear 19b and driving shaft 15 is as shown in FIGS. 2A and 2B. The member 31b is a single coil spring or double coil spring molded by integrally casting, including several loops 34b and a first and a second connecting end sections 35b and 36b respectively extending toward two ends thereof. The first connecting end section 35b is formed with several pin holes 37b and the second connecting end section 36b is formed with a conic inner surface 38b. The inner surface 38b can be covered by an anti-abrasion hoop member 66 made of metal or polymer material. The assembling procedure of the second coil spring transmission member 31b, driving shaft 15, second driving gear 19b and the second controlling pushing sleeve 33b is shown in FIGS. 3A to 3E, Wherein as shown in FIG. 3A, a bearing 39b is disposed between the driving shaft 15 and the second driving gear 19b, making the same freely rotatable without intervening each other. The second driving gear 19b has an extending sleeve section 40b formed with several pin holes 41b corresponding to the pin holes 37b of the second coil spring transmission member, whereby several insert pins 42b are respectively extended through the pin holes 37b and 41b to connect the second coil spring transmission member 31b with the second driving gear 19b and make the second coil spring transmission member 31b synchronously rotate therewith. As shown in FIGS. 3B and 3C, a second transmission sleeve 43b having a conic end section 44b is fitted between the driving shaft 15 and the second coil spring transmission member 31b and is fastened at a fastening position by a fastening nut 45b. By means of several key members 46b disposed between the second transmission sleeve 43b and the driving shaft 15, the same form an assembly in which the components rotate synchronously. The conic end section 44b of the second transmission sleeve 43b closely contacts with the anti-abrasion hoop member 66 disposed on the inner surface 38b of the second coil spring transmission member 31b and slightly pushes the second coil spring transmission member 31b, making the same under a slightly compressed condition. However, each loop 34b of the second coil spring transmission member is still spaced from the driving shaft 15 by a small clearance. Please refer to FIG. 3D, the second controlling pushing Sleeve 33b of the transmission controlling assembly is also sleeve-shaped and is fitted between the second transmission sleeve 43b and the second coil spring transmission member 31b without rotating along therewith. A roller pin bearing 71b is clamped between the second controlling pushing sleeve 33b and the second coil spring transmission member 31b, making the same independently rotate without intervening each other. The second controlling pushing sleeve 33b is normally resiliently forced by a spring 47b, whereby a free end 48b thereof is slightly spaced from a second end section 36b of the second coil spring transmission member. As shown in FIG. 3D, when the driving shaft 15 rotates in a direction identical to the coil direction of the second coil spring transmission member 31b, the power of the driving shaft 15 is transmitted to the second transmission sleeve 43b through the key member 46b and then by means of the conic end section 44b of the second transmission sleeve and the conic inner surface 38b of the second coil spring transmission member which closely contact each other, the respective loops 34b of the second coil spring transmission member 3b are forced to immediately fasten the driving shaft 15, making the power thereof instantly transmitted to the second coil spring transmission member 31b through the conic contacting surfaces 44b and 38b and respective loops 34b. The power is finally transmitted to the second driving gear 19b through the several insert pins 42b, making the second driving gear 19b rotate synchronously with the driving shaft 15. The fastening force of the respective loops 34b on the driving shaft 15 is increased in about quadruple equi-ratio progression. For example, if the initial torque of the second transmission sleeve 43b exerted on the conic inner surface 38b is 2 kgm, the fastening force of the fifth loop of the second coil spring transmission member 31b exerted on the driving shaft 15 will be Up to about 512 kgm. In addition, the anti-abrasion hoop member 66 disposed on the conic inner surface 38b will not only increase the abrasion-resistance of the second coil spring transmission member 31b but also insure the close contact between the conic contacting surfaces 44b and 38b for increasing the fastening stress strength of the second coil spring transmission member 31b on the driving shaft 15 and the second transmission sleeve 43b when suffering force. However, as shown in FIG. 3E, when the second controlling pushing sleeve 33b pushes the second end section 36b of the second coil spring transmission member in an axial direction indicated by arrow A to make the same separate from the conic end section 44b of the second transmission sleeve, the second end section 36b of the second coil spring transmission member suffers no force, making the respective loops 34b restore to the original positions which are spaced from the driving shaft 15 by a predetermined distance. At this time, the power of the driving shaft 15 is prevented from being transmitted to the second coil spring transmission member 31b and the second driving gear 19b and because the bearing 39b is disposed between the driving shaft 15 and the second driving gear 19b, the same are allowed to respectively rotate at different speeds. As shown in FIGS. 1 and 9A to 9J, the second controlling pushing sleeve 33b is pushed by a first controlling rotary disk 50 of the transmission controlling assembly 32 through a second rod member 49b. The first controlling rotary disk 50 is formed with several continuous or intermittent guide slots 51b, 51c and 51d, whereby when rotating the first controlling rotary disk 50 and making the second rod member 49b enter the second guide slot 51b, because the second controlling pushing sleeve 33b suffers the resilient force of the spring 47b, the free end 48b thereof is slightly spaced from the second end section 36b of the second coil spring transmission member, so that the power of the driving shaft 15 is directly transmitted to the second driving gear 19b. When the first controlling rotary disk 50 is further rotated to make the second rod member 49b separate from the second guide slot 51b and climb up to a relatively high surface 52 of the first controlling rotary disk 50, the second rod member 49b pushes the second controlling pushing sleeve 33b, making the same push the second coil spring transmission member 31b and separate the same from the second transmission sleeve 43b to further prevent the power of the driving shaft 15 from being directly transmitted to the second driving gear 19b.

The third coil spring transmission member 31c disposed between the second and third driving gears 19b and 19c and the fourth coil spring transmission member 31d disposed between the third and fourth driving gears 19c and 19d are the same as the aforesaid second coil spring transmission member 31b in structure, assembly and operation and will not be described hereinafter.

The seventh coil spring transmission member 31g disposed between the third driven gear 20c and the driven shaft 18 is as shown in FIGS. 2C and 2D. The seventh coil spring transmission member 31g is substantially identical to the second coil spring transmission member 31b, being a single-coil or a double-coil spring made by integrally casting and having several loops 34g and a first and a second end sections 35g and 36g. The first end section 35g is formed with several pin holes 37g and the second end section 36g is disposed with a bearing seat for mounting a one-way bearing 71g clamped between the seventh coil spring transmission member 31g and driven shaft 18. Please refer to FIG. 4, a bearing 39g is disposed between the third driven gear 20c and the driven shaft 18 so that the same are able to freely rotate without intervening each other. The third driven gear 20c has an extending sleeve section 40g formed with several pin holes 41g corresponding to the pin holes 37g of the seventh coil spring transmission member, whereby several insert pins 42g are extended through the pin holes 37g and 41g, making the seventh coil spring transmission member 31g connect with the third driven gear 20c and rotate synchronously therewith. The inner diameter of the seventh coil spring transmission member 31g is originally slightly smaller than the outer diameter of the driven shaft 18, so that the driven shaft 18 is inward fastened by the respective loops 34g of the seventh coil spring transmission member 31g fitted with the driven shaft 18. Therefore, the power of the third driven gear 20c can be transmitted to the driven shaft 18 through the seventh coil spring transmission member 31g. Because the third driven gear 20c and the driven shaft 18 rotate in a direction identical to the coil direction of the seventh coil spring transmission member 31g, when other external force is exerted on the driven shaft 18, the same is able to rotate at a speed higher than or equal to that of the third driven gear 20c. The driven shaft 18 is a substantially hollow sleeve member and a lateral car wheel shaft 26 is permitted to extend through a central through hole of the driven shaft 18 with a small clearance kept therebetween.

The fifth coil spring transmission member 3e disposed between the first and second driven gears 20a and 20b and the sixth coil spring transmission member 31f disposed between the second and third driven gears 20b and 20c are the same as the aforesaid seventh coil spring transmission member 31g in structure, assembly and operation and will not be described hereinafter.

Figure 6C:
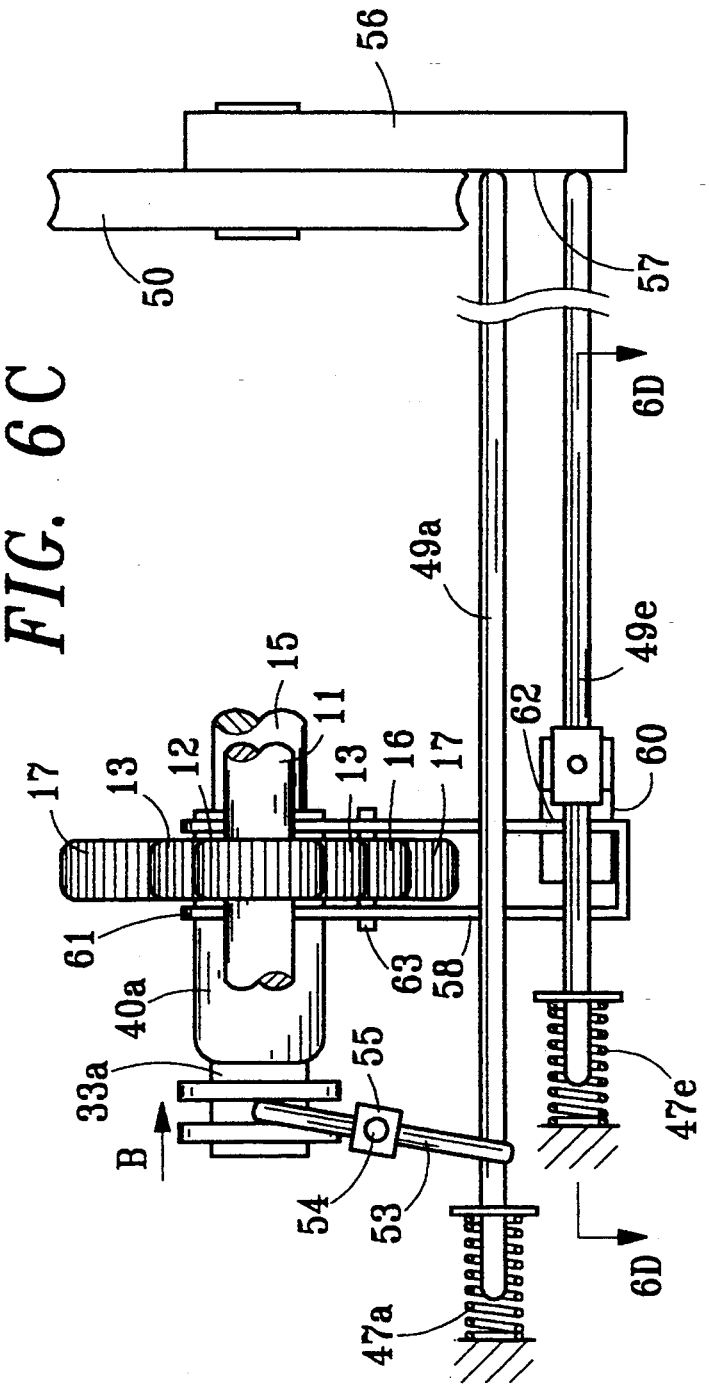
FIG. 6C is a front view of the running mode controlling device in the idling mode.

Please refer to FIGS. 5A and 5B. The running mode controlling device 14 has an idling controlling assembly which is substantially identical to the driving shaft 15 and second driving gear 19b shown in FIGS. 3A to 3E in structure and controlling manner. The power of the driven gear 13 of the pre-reducing gear set is transmitted to the driving shaft 15 through a detachable first coil spring transmission member 31a. The driven gear 13 has an extending sleeve section 40a and the first coil spring transmission member 31a is disposed between the sleeve section 40a and the driving shaft 15. By means of several insert pins 42a, the first coil spring transmission member 31a is engaged with the sleeve section 40a and rotates synchronously therewith. A first transmission sleeve 43a having a conic end section 44a is fitted between the driving shaft 15 and the first coil spring transmission member 31a and is fixed at a fastening position by a fastening nut 45a. By means of several key members 46a disposed between the first transmission sleeve 43b and the driving shaft 15, the same form an assembly in which the components rotate synchronously. The conic end section 44a of the first transmission sleeve 43a closely contacts with the inner surface 38a of the first coil spring transmission member 31a and slightly pushes the first coil spring transmission member 31a, making the same under a slightly compressed condition. However, each loop 34a of the first coil spring transmission member is still spaced from the driving shaft 15 by a small clearance. A first controlling pushing sleeve 33a is controlled by a driving member 53 to linearly reciprocally move between a first position shown in FIG. 5A and a second position shown in FIG. 5B. The first controlling pushing sleeve 33a is used to push the first coil spring transmission member 31a and separate the same from the first transmission sleeve 43a. Please refer to FIGS. 6A, 6B and 7A. The driving member 53 is fitted with the first controlling pushing member 33a at one end and is fixed on one end of a first rod member 49a at the other end. In addition, a substantially middle portion of the driving member 53 is supported on a support seat 55 by a fulcrum shaft 54, whereby the driving member 53 is able to perform lever movement with the fulcrum shaft 54 serving as a fulcrum. The other end of the first rod member 49a extends to contact with a second controlling rotary disk 56 which is integrally connected with the first controlling rotary disk 50 for controlling the transmission movement and rotates synchronously therewith. The second controlling rotary disk 56 is disposed with a first guide slot 51a. As shown in FIGS. 5A and 6A, when rotating the second controlling rotary disk 56 and making the first rod member 49a enter the first guide slot 51a, the first rod member 49a suffers the resilient force of a spring 47a and thus linearly moves toward the second controlling rotary disk 56, making the driving member 53 move the first controlling pushing sleeve 33a toward the first position. At this time, the first controlling pushing sleeve 33a is slightly spaced from the first coil spring transmission member 31a while the conic inner surface 38a of the first coil spring transmission member closely contacts with the conic end section 44a of the first transmission sleeve 43a for transmitting power to each other, i.e., the power of the driven gear 13 is transmitted to the first coil spring transmission member 31a through the insert pins 42a and then further transmitted to the driving shaft 15 connected with the first transmission sleeve 43a through the closely inter-contacting conic inner surface 38a of the first coil spring transmission member and the conic end section 44a of the first transmission sleeve. In the instant of starting power transmission, the respective loops 34a of the first coil spring transmission member 31a are forced to immediately fasten the driving shaft 15, making the power of the first coil spring transmission member 31a instantly transmitted to the driving shaft 15 through the conic contacting surfaces 44a and 38a and the respective loops 34a. As shown in FIGS. 5B and 6C, when the second controlling rotary disk 56 is further rotated to make the first rod member 49a separate from the first guide slot 51a and climb up to a relatively high surface 57 of the second controlling rotary disk 56, the axially moving first rod member 49a drives the driving member 53 to act as a lever so as to move the first controlling pushing sleeve 33a toward the second position in a direction indicated by arrow B, and then the first controlling pushing sleeve 33a axially pushes the first coil spring transmission member 31a, making the same separate from the conic end section 44a of the first transmission sleeve. Simultaneously, the respective loops 34a of the first coil spring transmission member restore to the original positions which are spaced from the driving shaft 15 by a predetermined distance. At this time, the power of the driven gear 13 and the first coil spring transmission member 31a is unable to be transmitted to the first transmission sleeve 43a and the driving shaft 15, so that the driving shaft 15 is prevented from rotating along with the engine shaft and thus the car is allowed to idle or run backward.

Figure 6D:
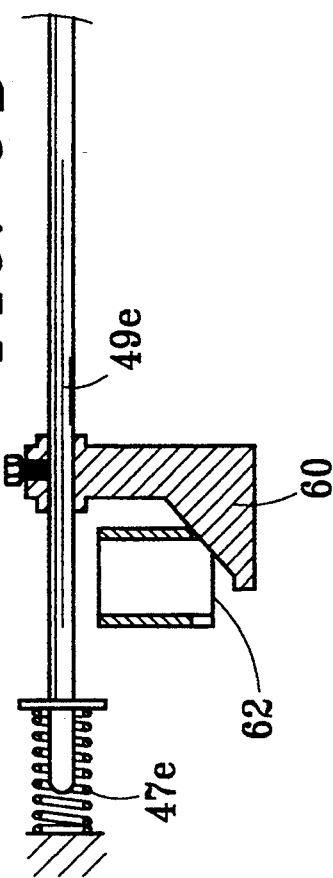
FIG. 6d is a sectional view taken along line 6D—6D of FIG. 6C.
Figure 7A:
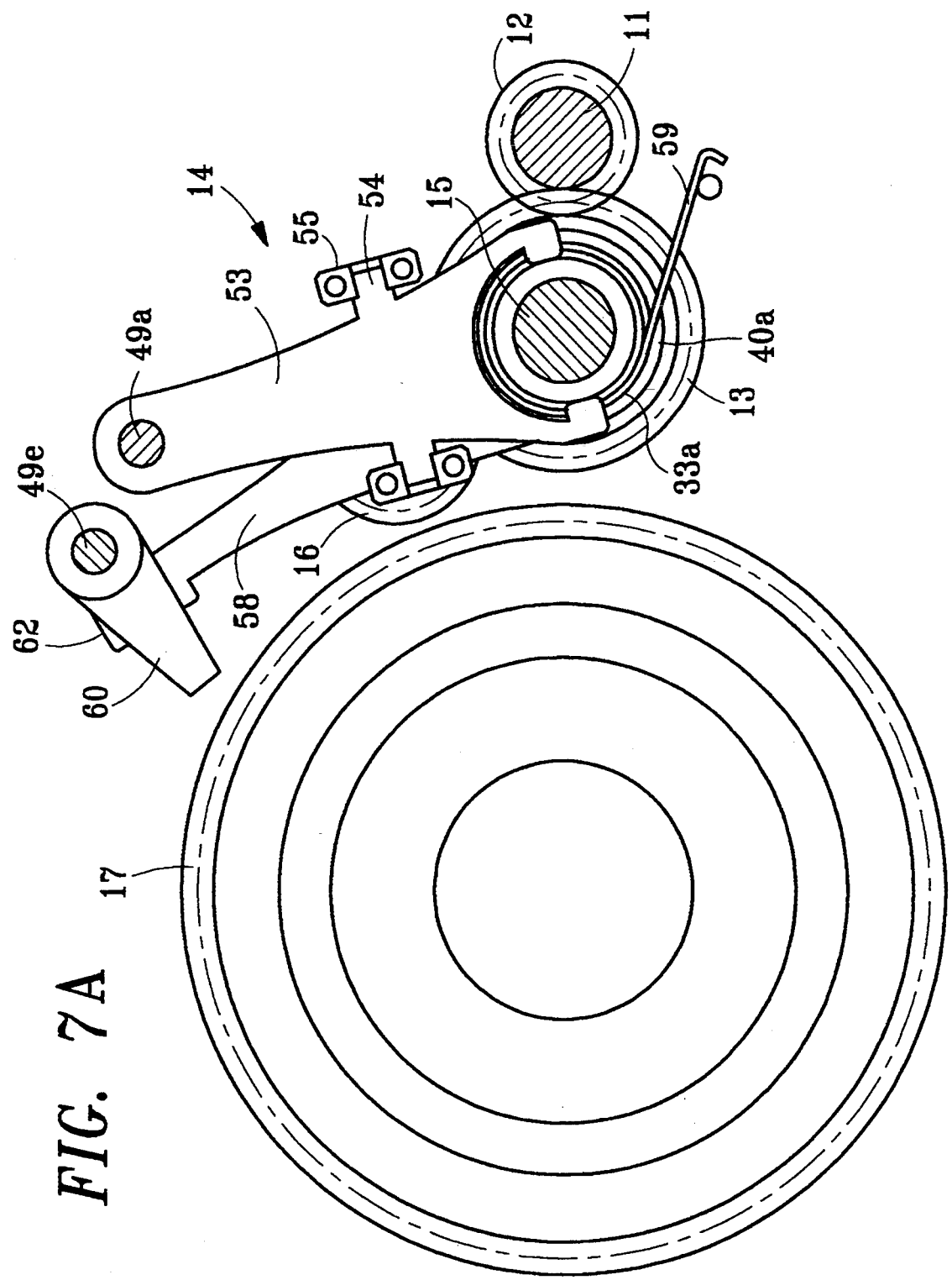
FIG. 7A is a sectional view of the running mode controlling device.
Figure 7B:
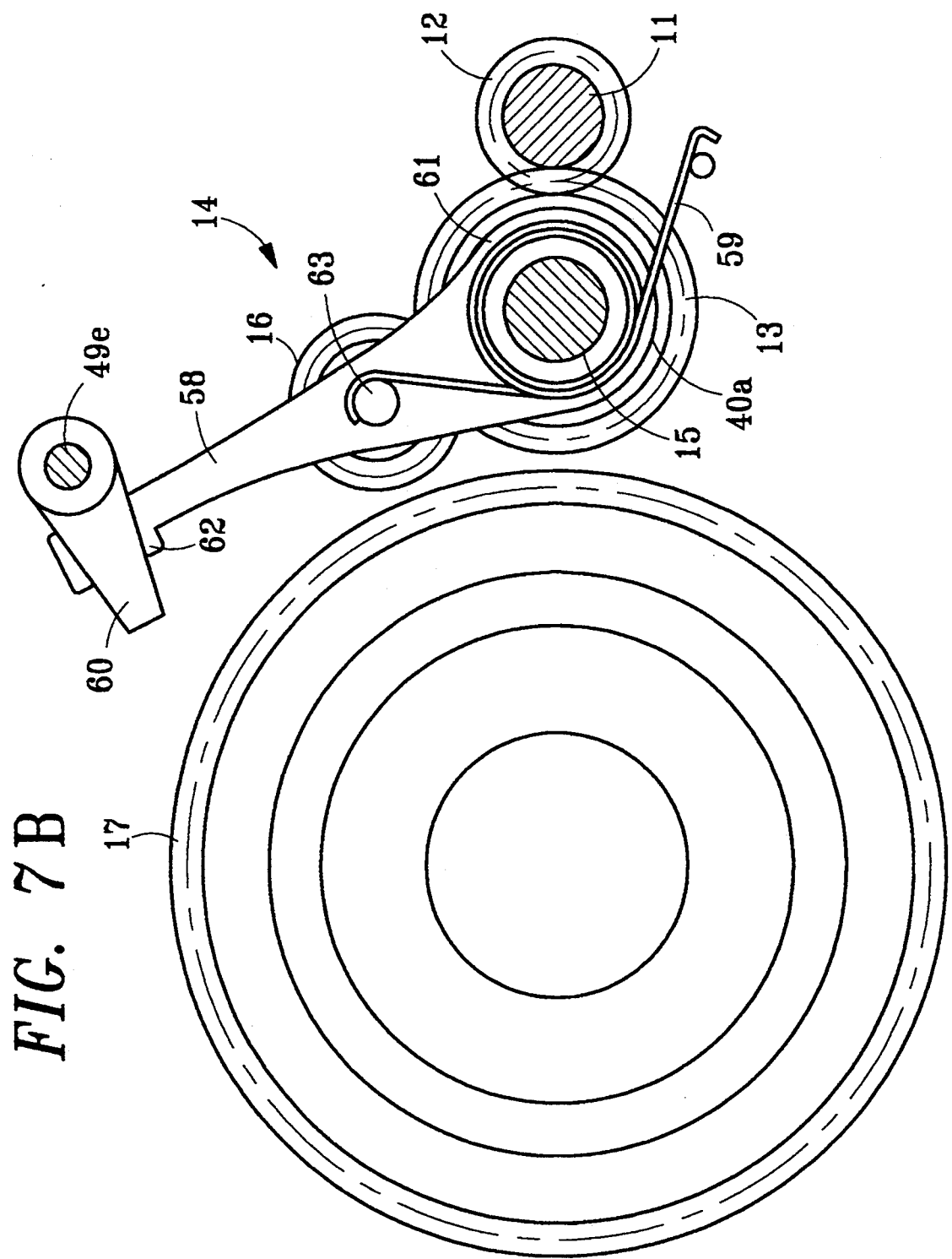
FIGS. 7B and 7C are similar to FIG. 7A, respectively showing the running mode controlling device in the forward running/idling mode and backward running mode, wherein the idling controlling assembly is omitted.
Figure 7C:
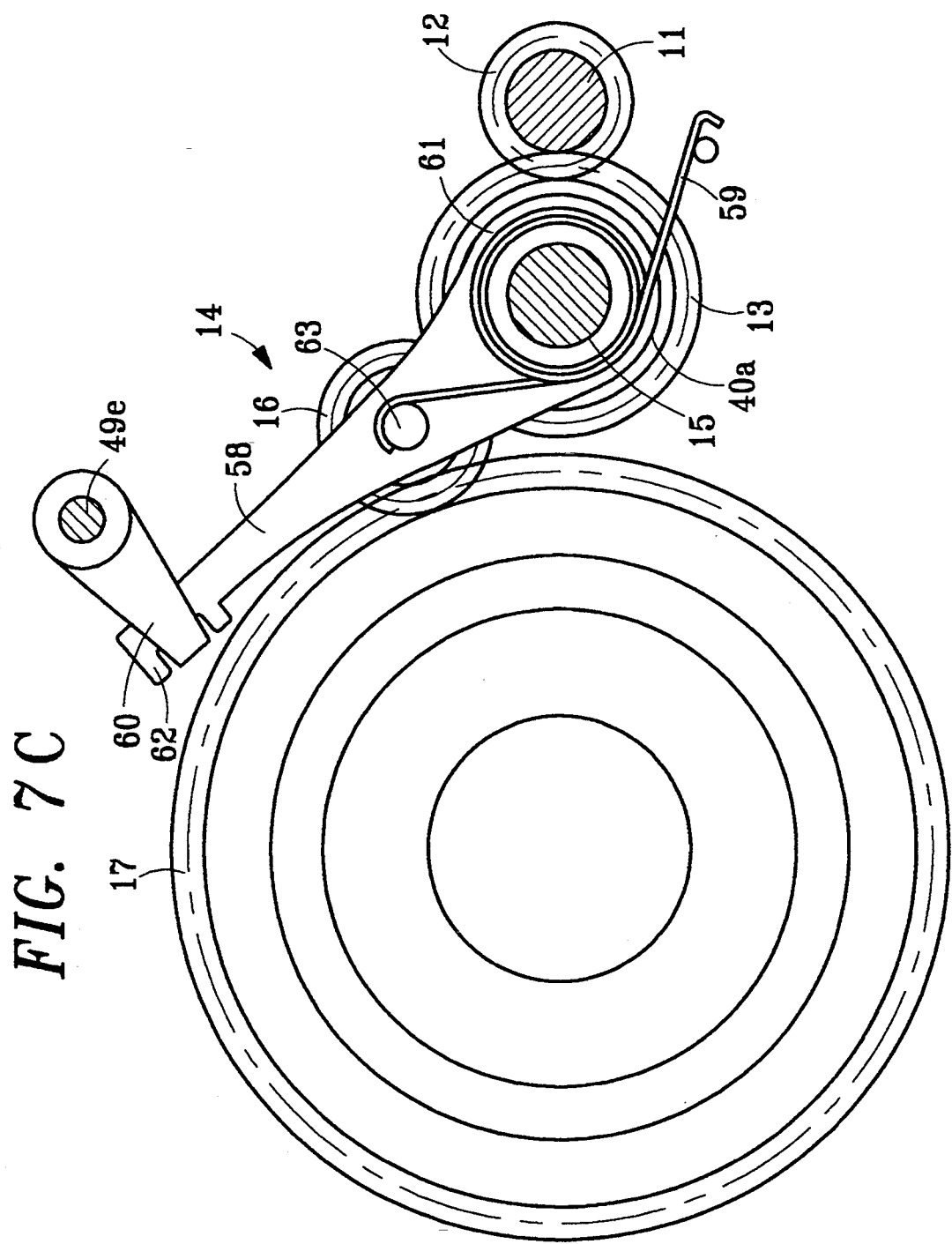

Please refer to FIGS. 7A to 7C. In addition to the above idling controlling assembly, the running mode controlling device 14 further includes a backward running controlling assembly which mainly includes a pivoting member 58, a torque spring 59, a wedge slide block 60 and a fifth rod member 49e. The pivot membering 58 has a fixed end 161 pivotally connected with the extending sleeve section 40a of the driven reducing gear 13 and a free end 62 relatively slidably abutting against the wedge slide block 60, whereby the pivot membering 58 can be pushed by the wedge slide block 60 to rotate about the fixed end 61. In addition, a gear shaft 63 for supporting an idler 16 is pivotally connected with an approximately middle portion of the pivoting member 58 so that the idler 16 is pivoted along with the pivoting member 58 and can be kept engaged with the driven reducing gear 13 at any time. Please refer to FIGS. 6C, 6D and 7B. The wedge slide block 60 is fixed on one end of the fifth rod member 49e to linearly reciprocally move along therewith. The other end of the fifth rod member 49e extends to contact with the second controlling rotary disk 56. When the fifth rod member 49e contacts with a relatively high surface 57 of the second controlling rotary disk 56, the free end 62 of the pivoting member 58 abuts against a relatively high portion of the wedge slide block 56 to force the pivoting member 58 to overcome the resilient force of the torque spring 59 and rotate to a position shown in FIG. 7B where the idler 16 is far away from the backward gear 17. As shown in FIGS. 6E, 6F and 7C, when the second controlling rotary disk 56 is rotated to a condition under which the car keeps idling, the second controlling rotary disk 56 can be further rotated until the fifth rod member 49e enters the fifth guide slot 51e of the second controlling rotary disk 56. At this time, the fifth rod member 49e together with the wedge slide block 60 fixed thereon suffers the resilient force of the spring 47e to linearly move toward the second controlling rotary disk 56 and make the free end 62 of the pivoting member 58 slide along an inclined surface of the wedge slide block 60 toward a relatively low position and thus make the pivoting member 58 suffer the resilient force of the torque spring 59 to rotate toward a position shown in FIG. 7C where the idler 16 is forced to engage with the backward gear 17. Therefore, the power of the driven reducing gear 13 is able to be transmitted to the backward gear 17 through the idler 16, making the car run backward.

Please refer to FIG. 1. The aforesaid synchronous first and second controlling rotary disks 50 and 56 are used to respectively control the transmission ratio and running mode during forward running. The driver can move a manually operated gear lever 64 fixed on the controlling rotary disk 50 so as to control and keep the car idling, backward running or forward running by different transmission ratios. Alternatively, the controlling rotary disk 50 can be automatically controlled. For example, the controlling rotary disk 50 is substantially a coil disk meshing with a coil lever 65. The coil lever 65 is driven to rotate through a predetermined angle at a predetermined time by a controlling circuit (not shown) which includes a torque detector and a stepped motor so as to automatically change the transmission ratios during forward running. Such transmission controlling circuit pertains to prior art and will not be described hereinafter.

Figure 8A:
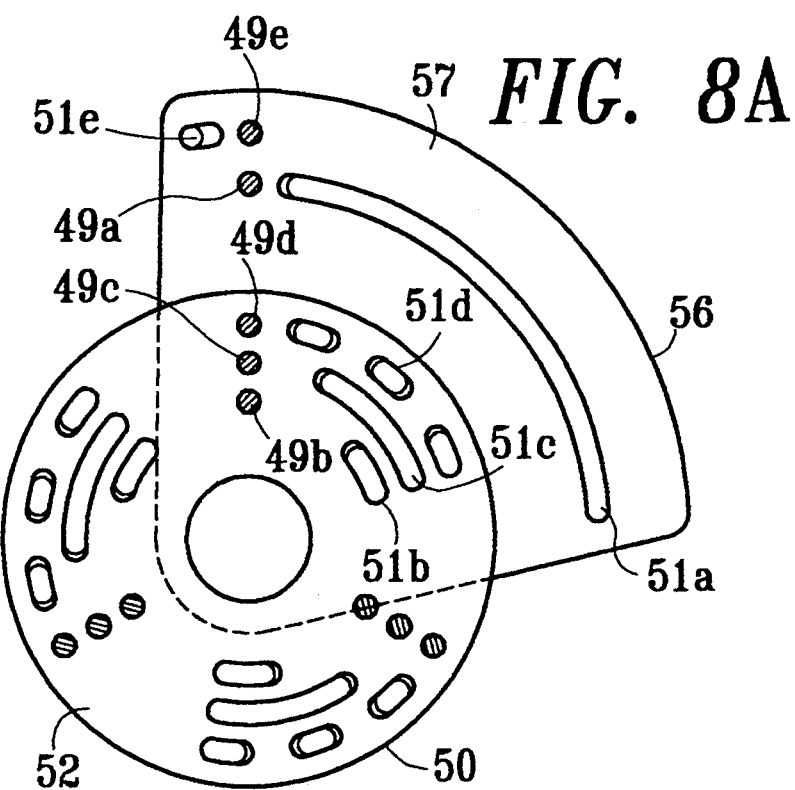
FIGS. 8A to 8H respectively show the location relationship of the transmission controlling assembly of the transmission system in different running modes and transmission ratios.
Figure 8B:
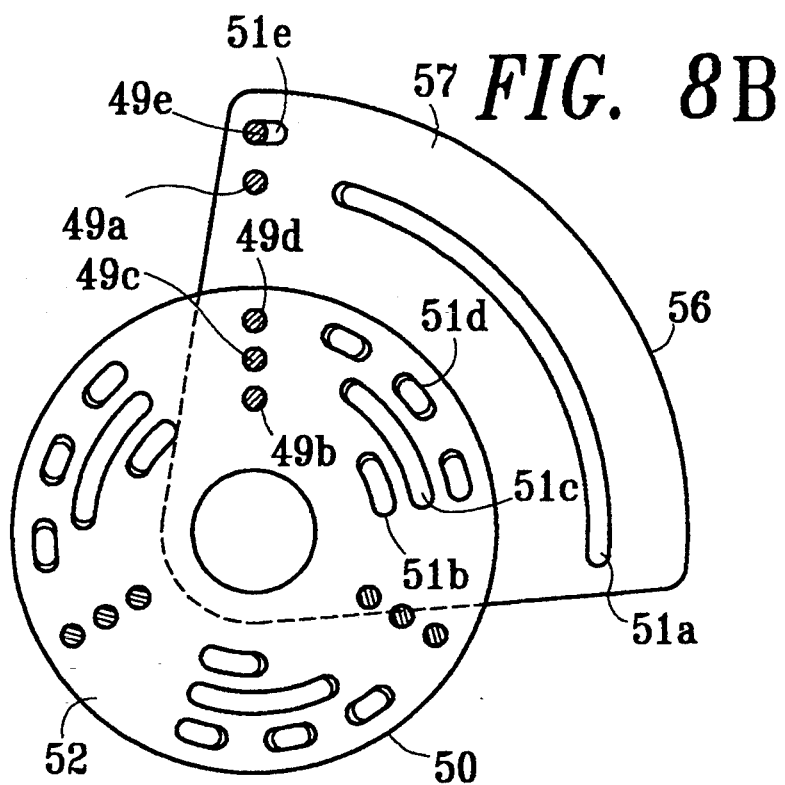
Figure 8C:
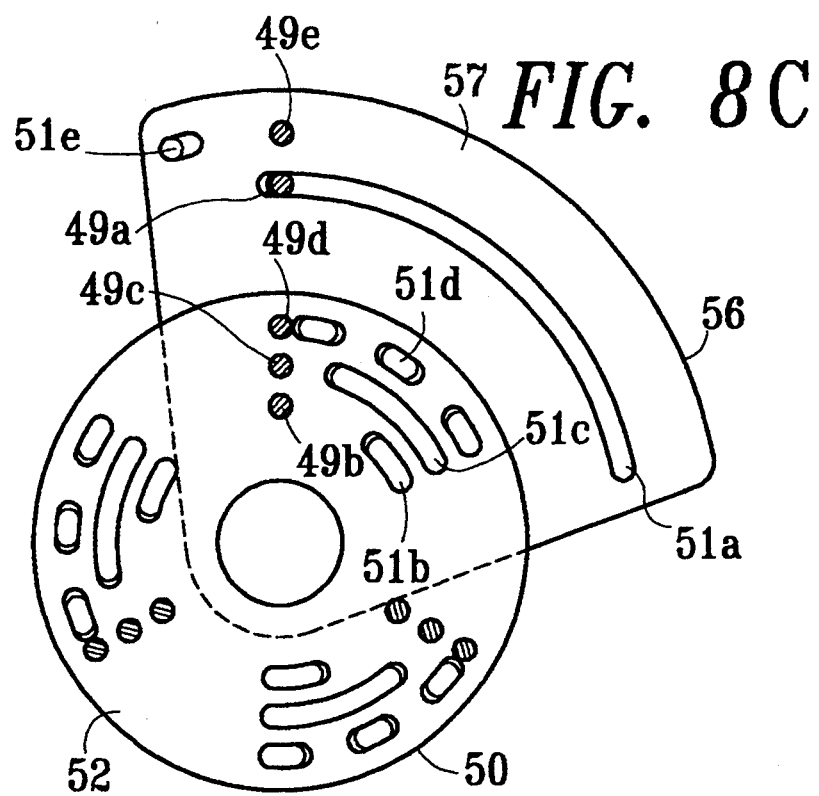
Figure 8D:
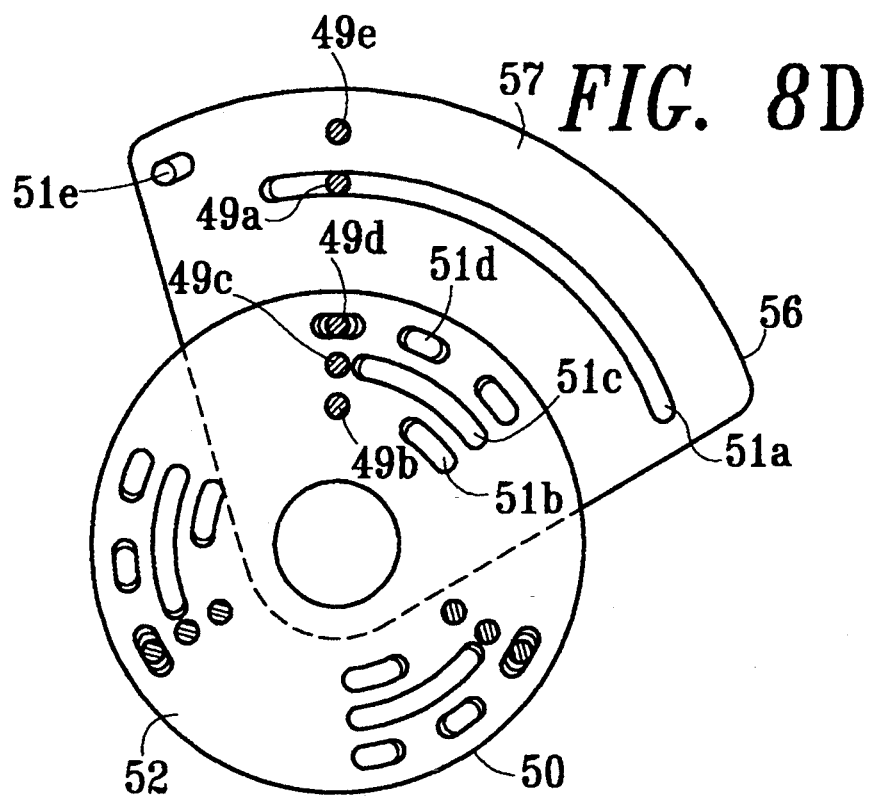
Figure 8E:
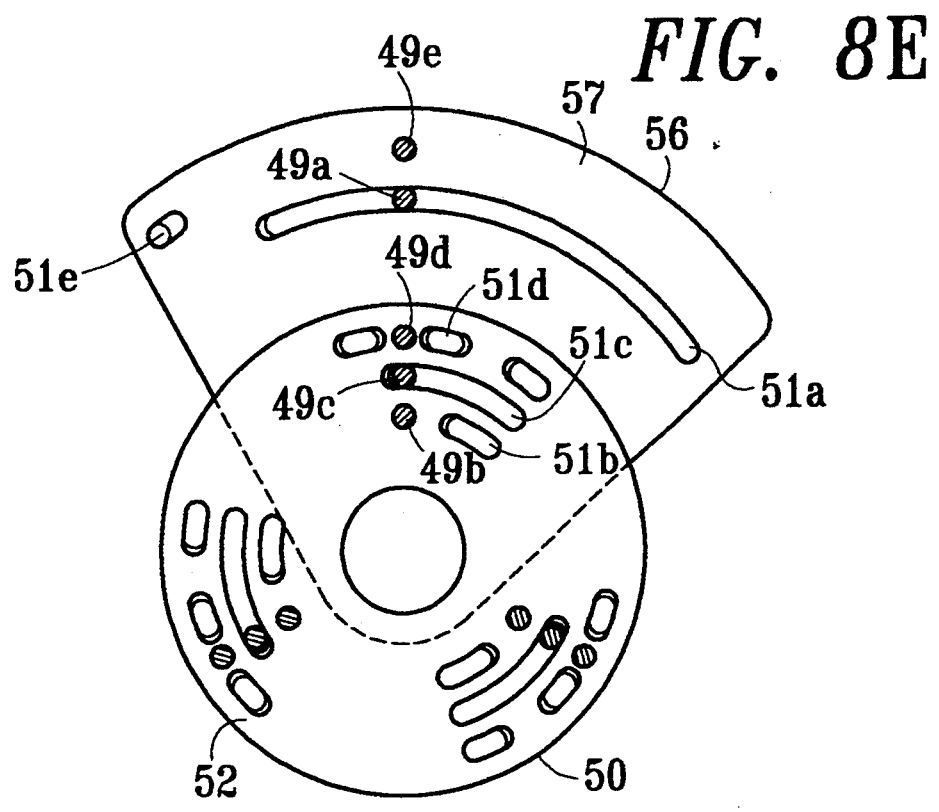
Figure 8F:
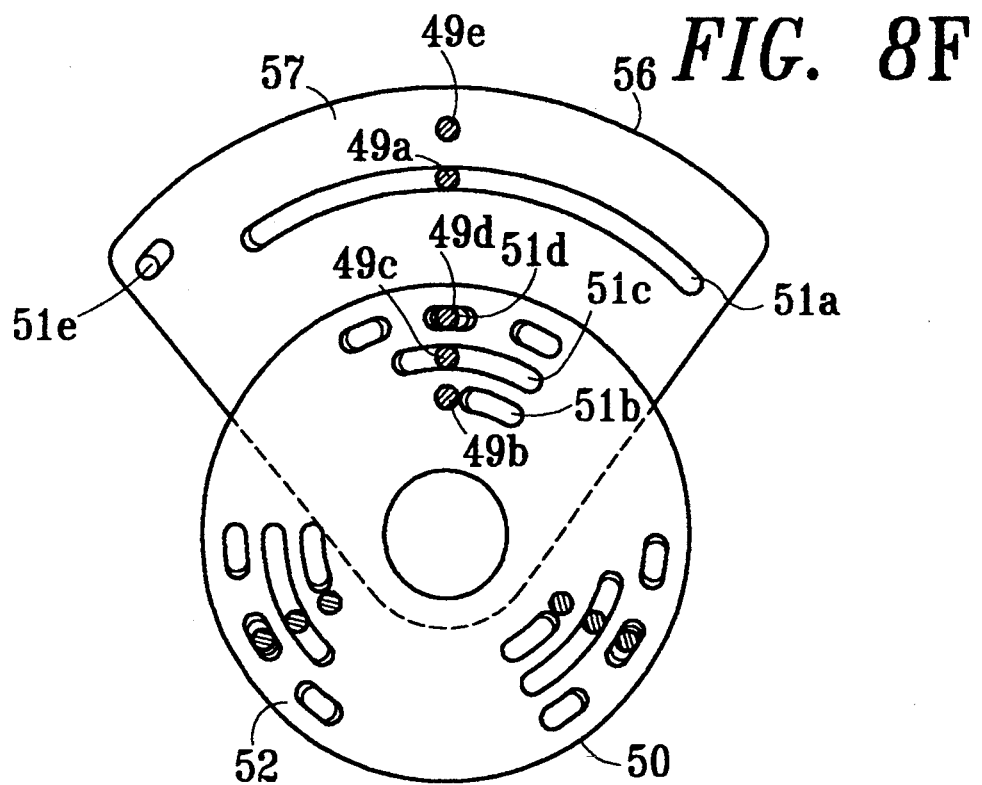
Figure 8G:
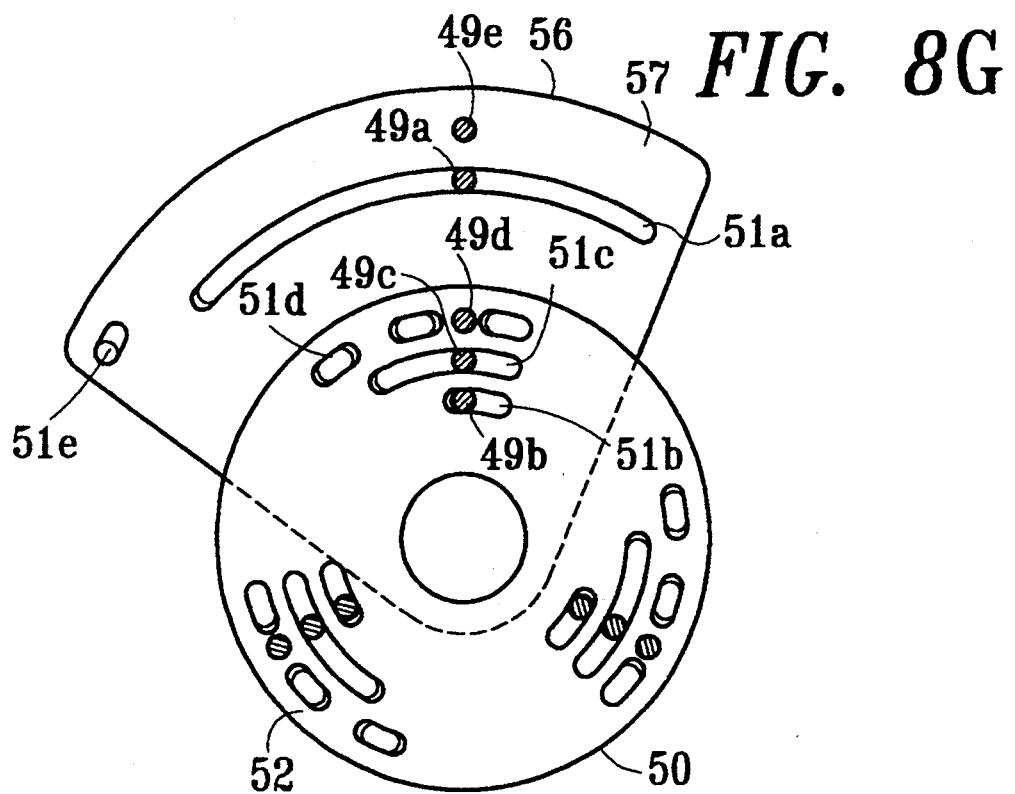
Figure 8H:
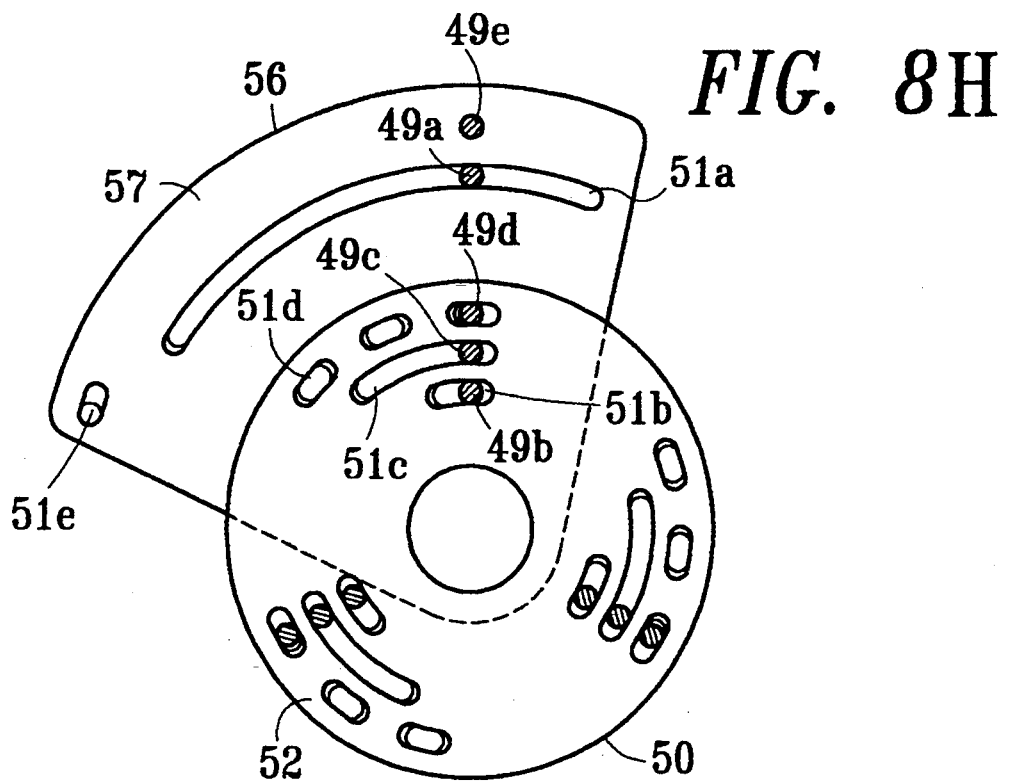

FIGS. 8A and 8H show the relationship between the first to fifth rod members 49a to 49e and the first and second controlling rotary disks 50 and 56 of the above transmission mechanism and running mode controlling device during different running modes or transmission ratios. The power transmission path thereof and the operation relationship between respective gears are shown in FIGS. 9A to 9J, wherein the gears not used to transmit power are shown by phantom lines. As shown in FIGS. 8A to 8H, the first controlling rotary disk 50 is formed with continuous or discontinuous second to fourth guide slots 51b, 51c and 51d, whereby when rotating the first controlling rotary disk 50, the second to fourth rod members 49b, 49c and 49d thereof for controlling the transmission can respectively or simultaneously enter the corresponding second to fourth guide slots 51b, 51c and 51d so as to change the transmission ratios. The second controlling rotary disk 56 is formed with first and fifth guide slots 51a and 51e which do not overlap the second, third and fourth guide slots, whereby when the second controlling rotary disk 56 rotates along with the first controlling rotary disk 50, the first and fifth rod members 49a and 49e thereof for controlling running mode can enter the corresponding first and fifth guide slots 51a and 51e at different times so as to make the car keep idling, running backward or running forward. The arch length of the first guide slot 51a is not less than the maximum one of the arch lengths of the second to fourth guide slots 51b, 51c and 51d, whereby when any of the second to fourth rod members 49b, 49c and 49d enters the corresponding guide slot, the first rod member 49a will inevitably enter the corresponding first guide slot 51a along therewith, so that the car is allowed to run forward at different speed levels.

Figure 9A:
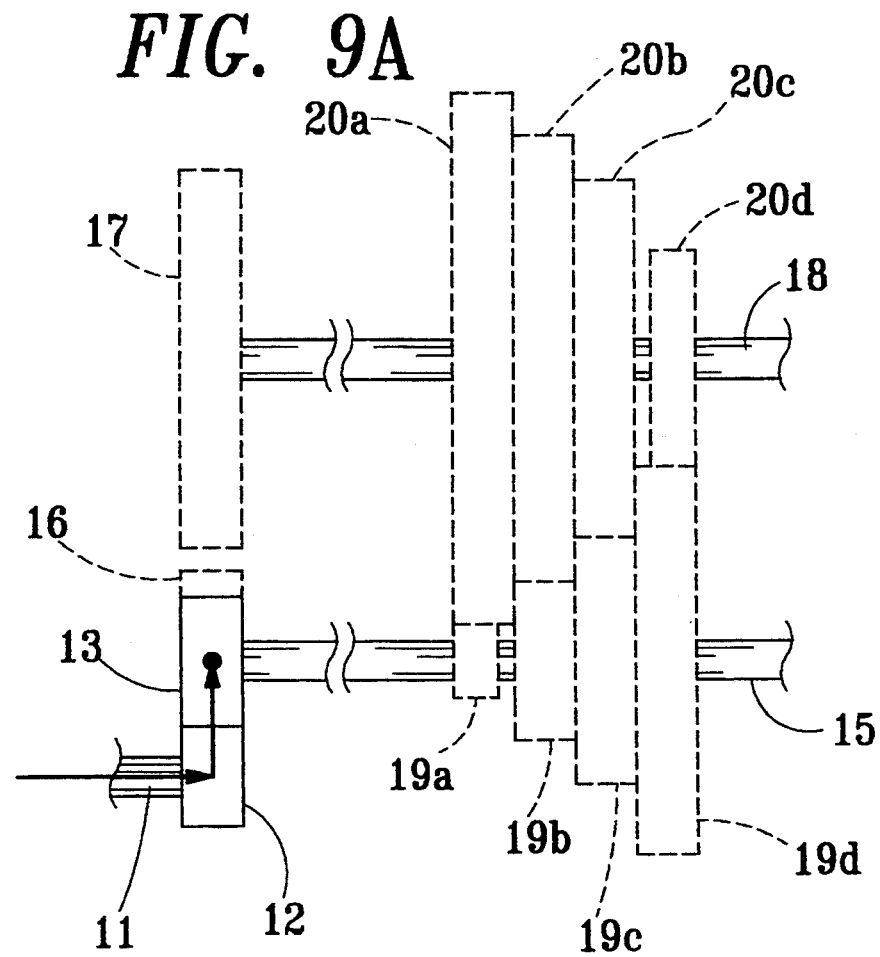
FIGS. 9A to 9J respectively show the power transmission paths of the transmission mechanism in different running modes and transmission ratios.

Please refer to FIGS. 8A and 9A. When the first and second controlling rotary disks 50 and 56 are rotated to such a position where the first to fifth rod members 49a to 49e are respectively located on the relatively high surfaces 52 and 57 of the rotary disks 50 and 56, the driven reducing gear 13 is separated from the driving shaft 15 (as shown in FIGS. 5B and 6C) and the idler 16 is separated from the backward gear 17 (as shown in FIGS. 6C and 7B), so that the power of the driven reducing gear 13 is unable to be transmitted to the driving shaft 15 or the backward gear 17 and thus the power transmission path is interrupted to make the car keep idling.

Figure 9B:
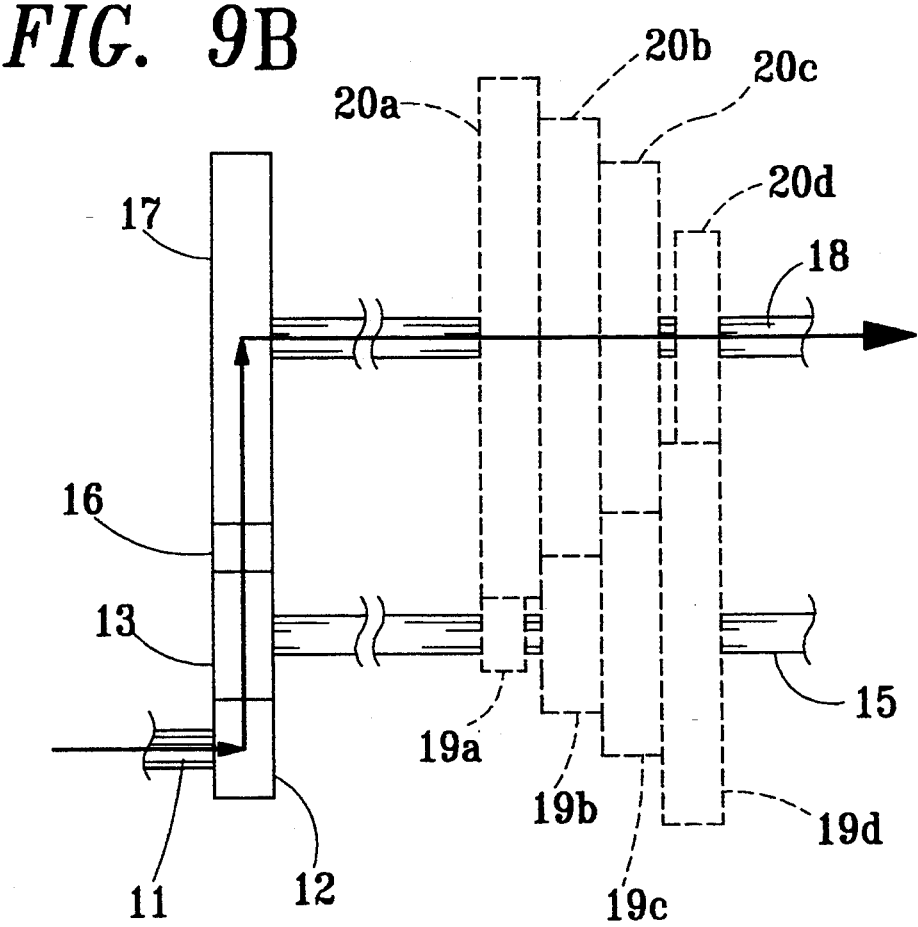

Please refer to FIGS. 8B and 9B. When the first and second controlling rotary disks 50 and 56 are rotated to such a position where the first to fourth rod members 49a to 49d are respectively located on the relatively high surfaces 52 and 57 of the rotary disks 50 and 56 and the fifth rod member 49e enters the fifth guide slot 51e, the driven reducing gear 13 is separated from the driving shaft 15 (as shown in FIGS. 5B and 6E) and thus the idler 16 is able to mesh with the backward gear 17 (as shown in FIGS. 6E and 7C), so that the power of the driven reducing gear 13 is only transmitted to the backward gear 17 and the driven shaft 18 through the idler 16 to make the car keep running backward.

Figure 9C:
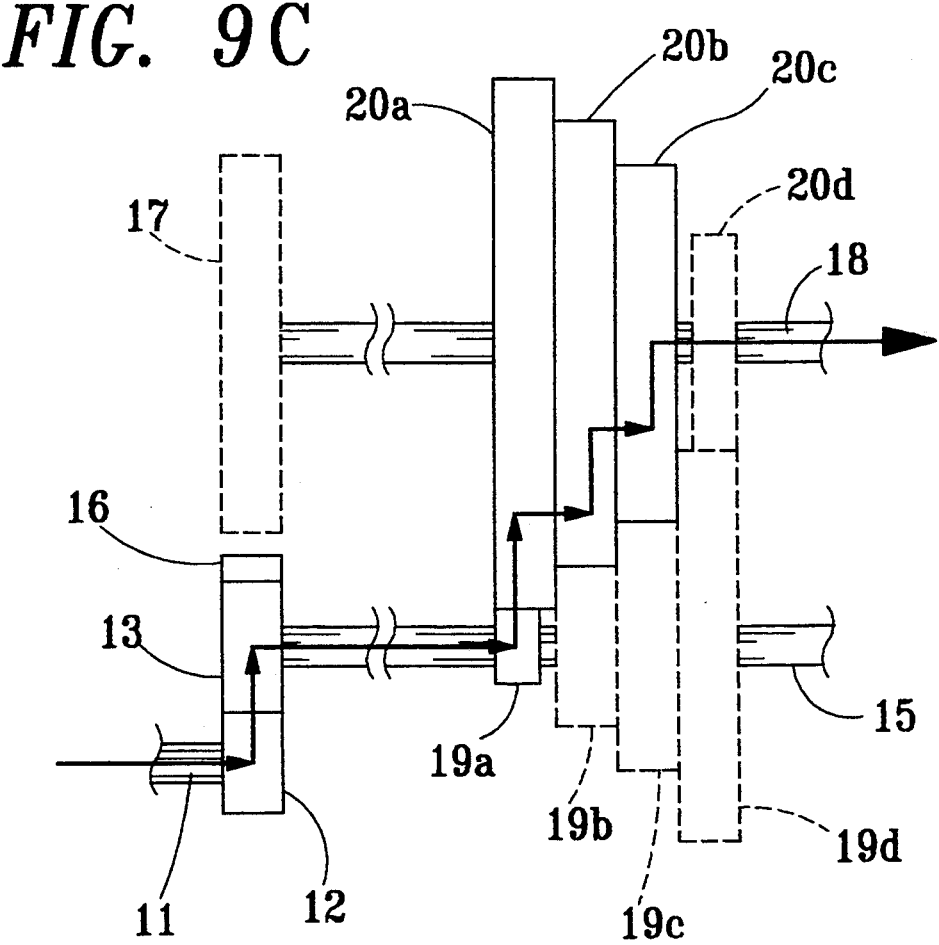

Please refer to FIGS. 8C and 9C. When the first and second controlling rotary disks 50 and 56 are rotated to a position where the second to fifth rod members 49b to 49e are respectively located on the relatively high surfaces 52 and 57 of the rotary disk 50 and 56 and the first rod member 49a enters the first guide slot 51a, the driven reducing gear 13 is engaged with the driving shaft 15 by means of the first coil spring transmission member 31a (as shown in FIGS. 5A and 6A) and the idler 16 is separated from the backward gear 17 (as Shown in FIGS. 6A and 7B). Because the second to fourth rod members 49b to 49d are located on the relatively high surfaces 52 of the first controlling rotary disk, the driving shaft 15 is separated from the second to fourth driving gears 19b to 19d (referring to FIG. 3E), so that these gears are able to independently freely rotate at the same or different speeds without intervening one another. Therefore, the power of the driven reducing gear 13 is transmitted to the driven shaft 18 through the driving shaft 15, first driving gear 19a and the first to third driven gears 20a to 20c which rotate at the same speed so as to make the car run forward at first speed level (first gear). During the power transmission at the first speed level, because the respective driving gears 19a to 19d are constantly engaged with and the corresponding driven gears 20a to 20d, so that the second to fourth driving gears 19b to 19d are respectively rotarily driven at different speeds by the second to fourth driven gears 20b to 20d which mesh therewith. However, since the driving shaft 15 is separated from the second to fourth driving gears 19b to 19d and is freely rotated independently therefrom, when the car runs forward at the first speed level, the second to fourth driving gears 19b to 19d substantially are all freely idling members which are not in charge of transmitting the power. On the other hand, the fourth driven gear 20d is directly fixed on the driven shaft 18 and spaced from the third driven gear 20c, whereby the fourth driven gear 20d rotates synchronously with the driven shaft 18 and independently from the third driven gear 20c. In addition, the first driving gear 19a is directly fixed on the driving shaft 15 and spaced from the second driving gear 19b, whereby the first driving gear 19a rotates synchronously with the driving shaft 15 and independently from the second driving gear 19b.

Figure 9D:
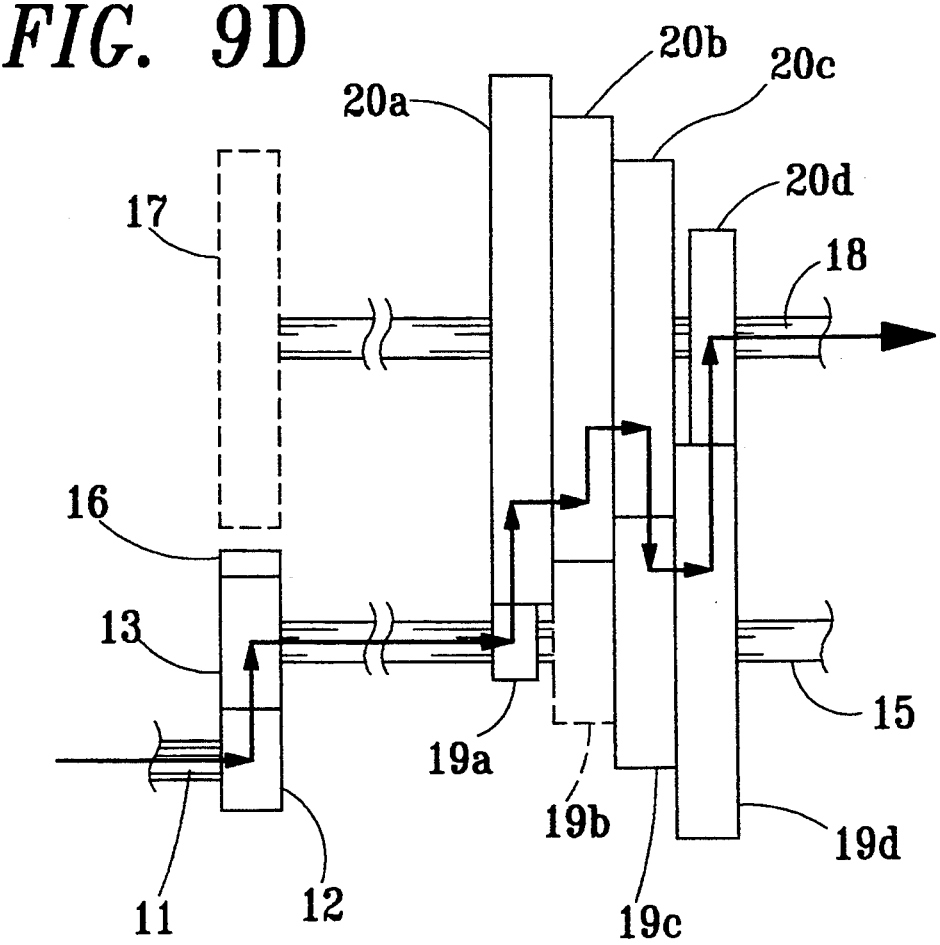

Please refer to FIGS. 8D and 9D. When the first and second controlling rotary disks 50 and 56 are rotated to such a position where the second, third and fifth rod members 49b, 49c and 49e fare located on the relatively high surfaces 52 and 57 of the rotary disks 50 and 56 and the first and fourth rod members 49a and 49d respectively enter the first and fourth guide slots 51a and 51d, the idler 16 is separated from the backward gear 17, the driving shaft 15 is separated from the second driving gear 19b and the second driving gear 19b is separated from the third driving gear 19c, while the driven reducing gear 13 is engaged with the driving shaft 15. Moreover, the third driving gear 19c is engaged with the fourth driving gear 19d by means of the fourth coil spring transmission member 31d (referring to FIG. 1), so that the power of the driven reducing gear 13 is transmitted to the driven shaft 18 through the driving shaft 15, the first driving gear 19a, the first to third driven gears 20a to 20c which rotate at the same speed, the third driving gear 19c, the fourth driving gear 19d and the fourth driven gear 20d in sequence, whereby the car is able to run forward at the second speed level. During the power transmission at the second speed level, the third and fourth driving gears 19c and 19d are engaged with each other and rotate at the same speed so as to make the fourth driven gear 20d rotate at a speed higher than that of the third driven gear 20c. In addition, the second driving gear 19b is a freely idling member and separated from the adjacent driving shaft 15 or the third driving gear 9c, so that the second driving gear 19b is able to freely rotate at different speeds without intervening the driving shaft 15 or the third driving gear 19c.

Figure 9E:
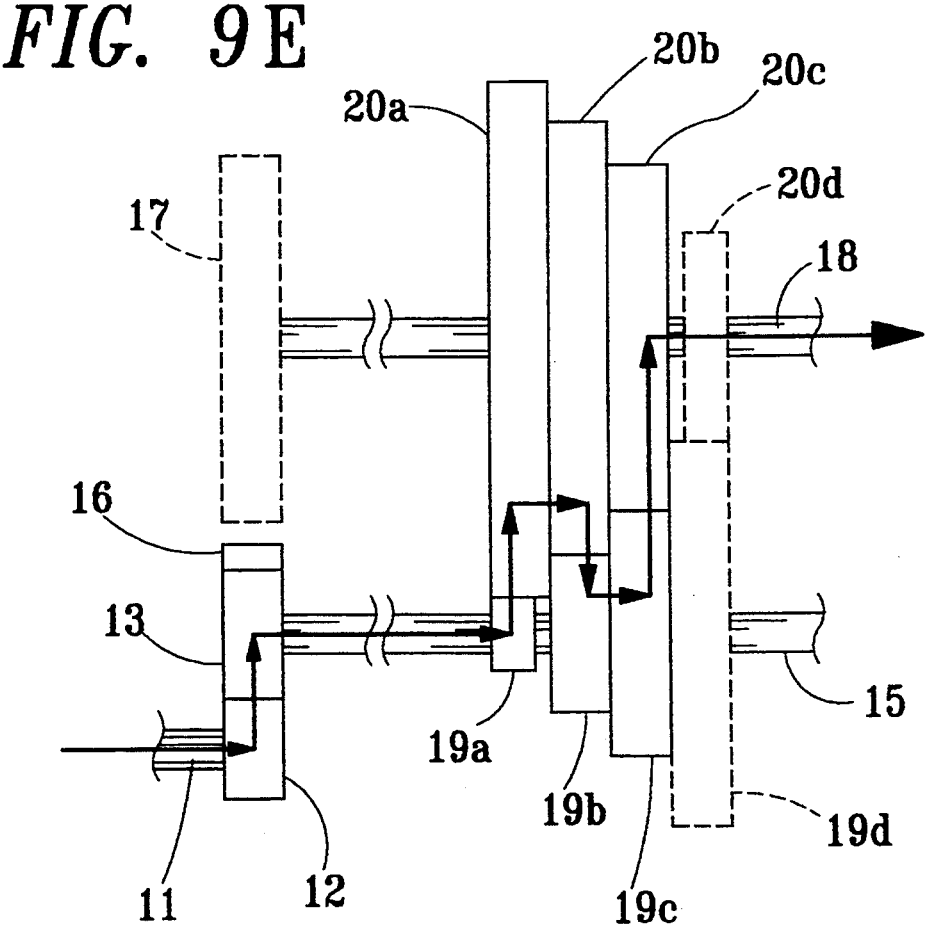

Please refer to FIGS. 8E and 9E. When the first and second controlling rotary disks 50 and 56 are rotated to such a position where the second, fourth and fifth rod members 49b, 49d and 49e are located on the relatively high surfaces 52 and 57 of the rotary disks 50 and 56 and the first and third rod members 49a and 49c respectively enter the first and third guide slots 51a and 51c, the idler 16 is separated from the backward gear 17, the driving shaft 15 is separated from the second driving gear 19b and the third driving gear 19c is separated from the fourth driving gear 19d, while the driven reducing gear 13 is engaged with the driving shaft 15 and the second driving gear 19b is engaged with the third driving gear 19c, so that the power of the driven reducing gear 13 is transmitted to the driven shaft 18 through the driving shaft 15, the first driving gear 19a, the first and second driven gears 20a and 20b which rotate at the same speed, the second and third driving gear 19b and 19c which are engaged with each other and rotate at the same speed and the third driven gear 20c in sequence, whereby the car is able to run forward at the third speed level. During the power transmission at the third speed level, the fourth driving gear 19d and the fourth driven gears 20d are freely idling members and because the second driving gear 19b is separated from the driving shaft 15, the second driving gear 19b is able to rotate at a speed lower than that of the driving shaft 15 and the first driving gear 19a.

Figure 9F:
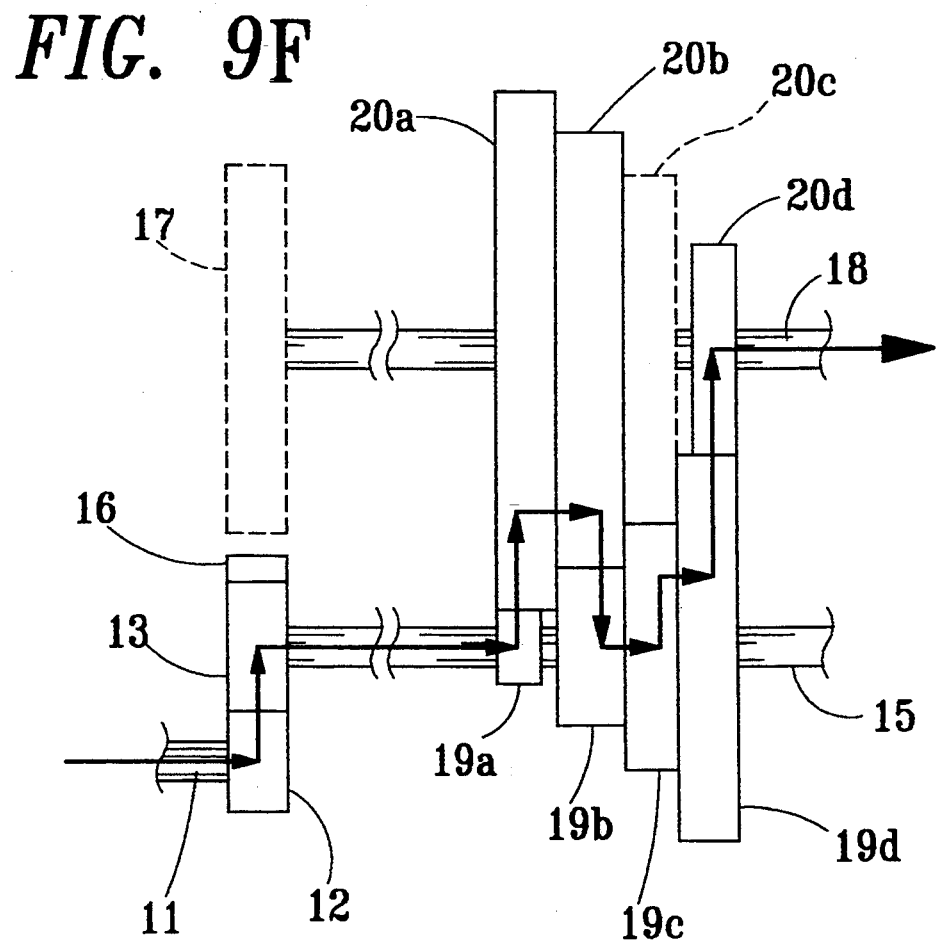

Please refer to FIGS. 8F and 9F. When the first and second controlling rotary disks 50 and 56 are further rotated to such a position where the second and fifth rod members 49b and 49e are located on the relatively high surfaces 52 and 57 of the rotary disks 50 and 56 and the first, third and fourth rod members 49a, 49c and 49d respectively enter the first, third and fourth guide slots 51a, 51c and 51d, the idler 16 is separated from the backward gear 17 and the driving shaft 15 is separated from the second driving gear 19b, while the driven reducing gear 13 is engaged with the driving shaft 15, the second driving gear 19b is engaged with the third driving gear 19c and the third driving gear 19c is engaged with the fourth driving gear 19d, so that the power of the driven reducing gear 13 is transmitted to the driven shaft 18 through the driving shaft 15, the first driving gear 19a, the first and second driven gears 20a and 20b which rotate at the same speed, the second to fourth driving gears 19b to 19d which are engaged with one another and the fourth driven gear 20d in sequence, whereby the car is able to run forward at the fourth speed level. During the power transmission at the second speed level, the third driven gears 20c is a freely idling member and because the second driving gear 19b is separated from the driving shaft 15, the second driving gear 19b is able to rotate at a speed lower than that of the driving shaft 15 and the first driving gear 19a.

Figure 9G:
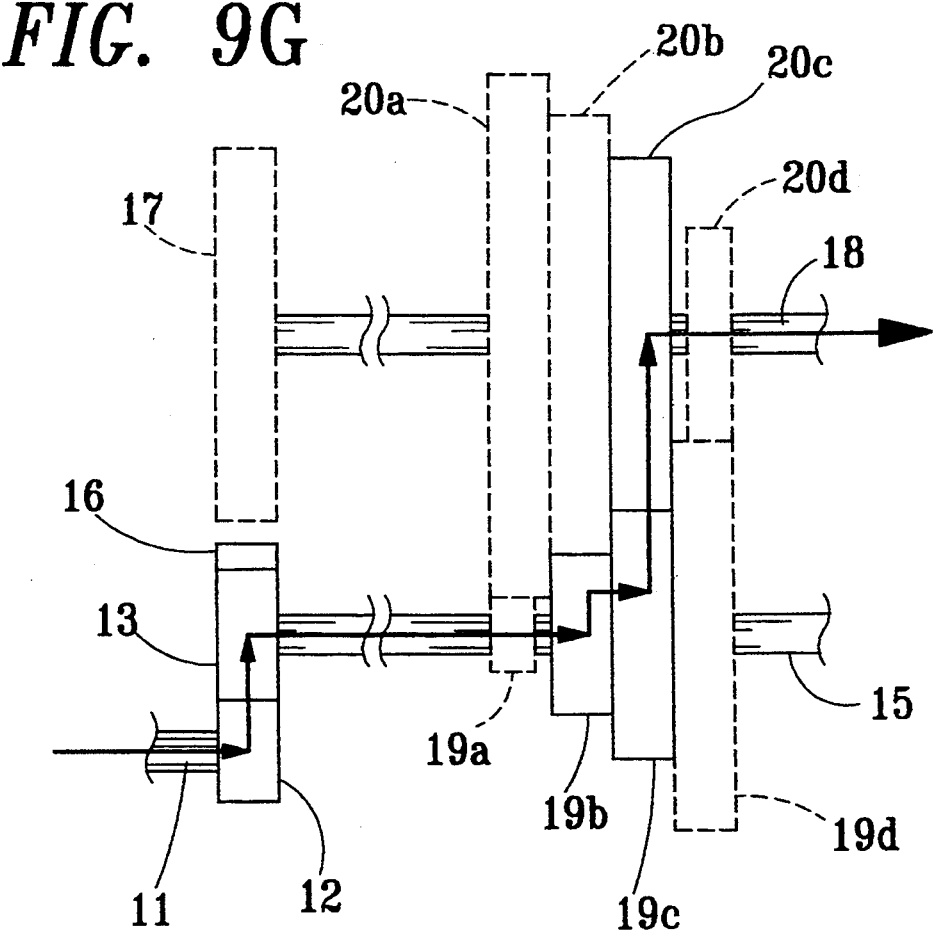

Please refer to FIGS. 8G and 9G. When the first and second controlling rotary disks 50 and 56 are further rotated to such a position where the fourth and fifth rod members 49d and 49e are located on the relatively high surfaces 52 and 57 of the rotary disks 50 and 56 and the first, second and third rod members 49a, 49b and 49c respectively enter the first, second and third guide slots 51a, 51b and 51c, the idler 16 is separated from the backward gear 17 and the third driving gear 19c is separated from the fourth driving gear 19d, while the driven reducing gear 13 is engaged with the driving shaft 15, the driving shaft 15 is engaged with the second driving gear 19b and the second driving gear 19b is engaged with the third driving gear 19c, so that the power of the driven reducing gear 13 is transmitted to the driven shaft 18 through the driving shaft 15, the second and third driving gears 19b and 19c and the third driven gear 20c which are engaged with one another and rotate at the same speed, whereby the car is able to run forward at the fifth speed level. During the power transmission at the fifth speed level, the first and fourth driving gears 19a and 9d and the first, second and fourth- driven gears 20a, 20b and 20d are freely idling members.

Figure 9H:
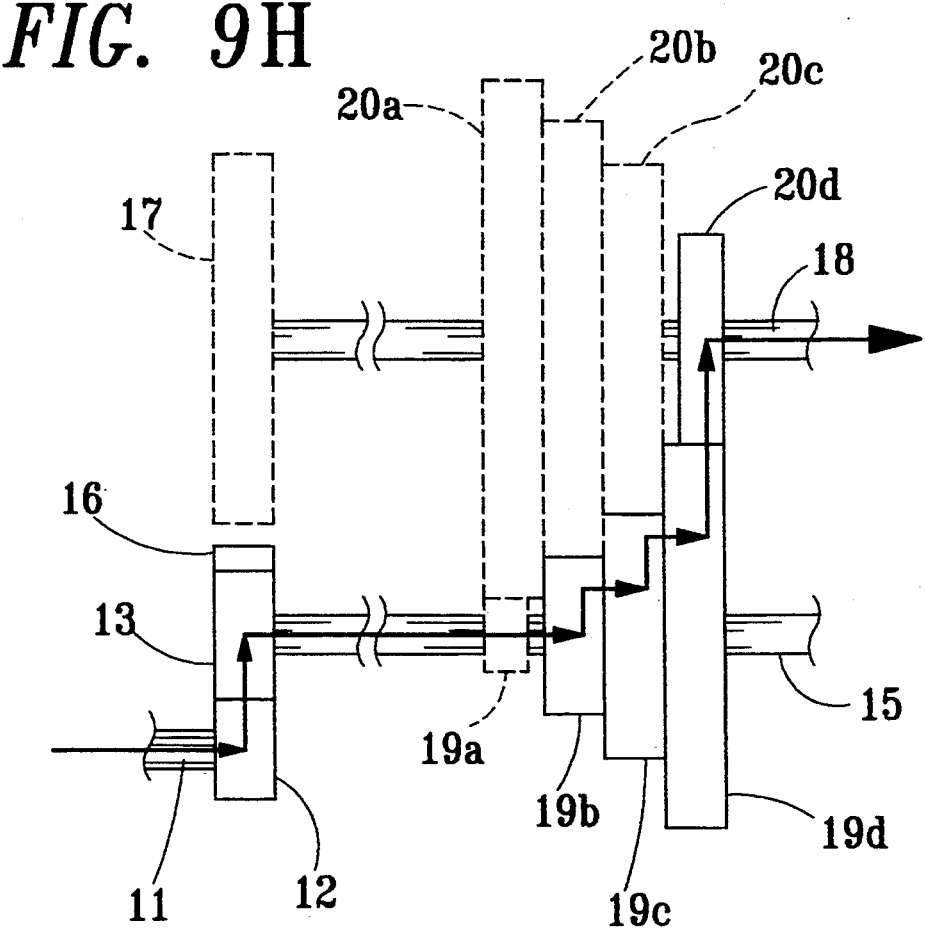
Figure 9:
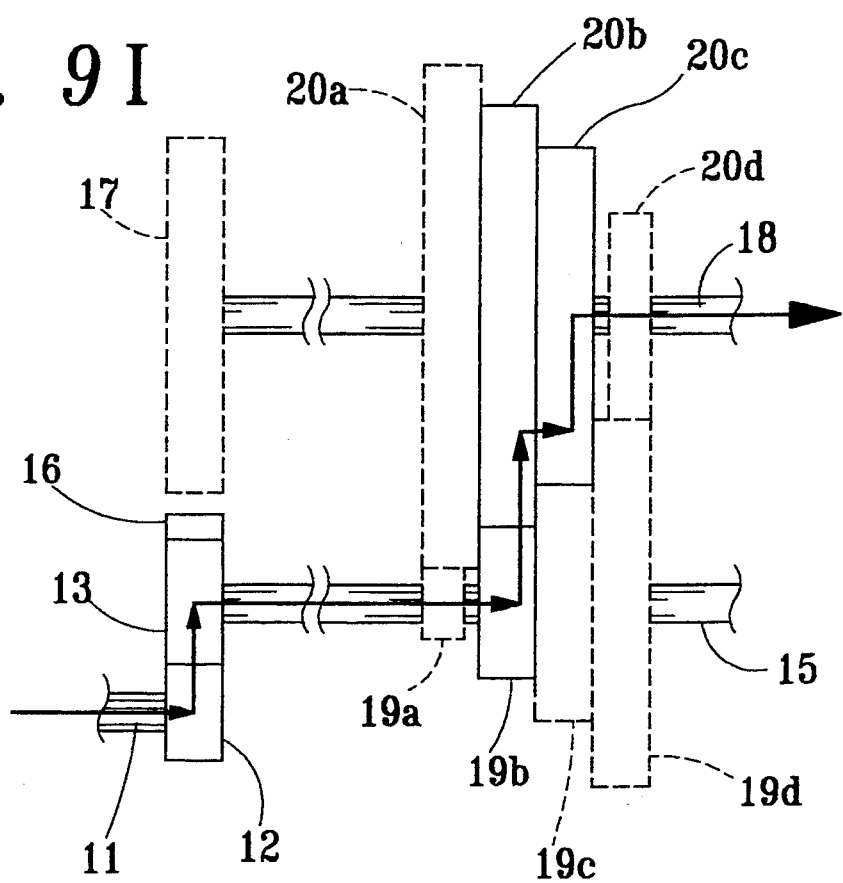
Figure 9:
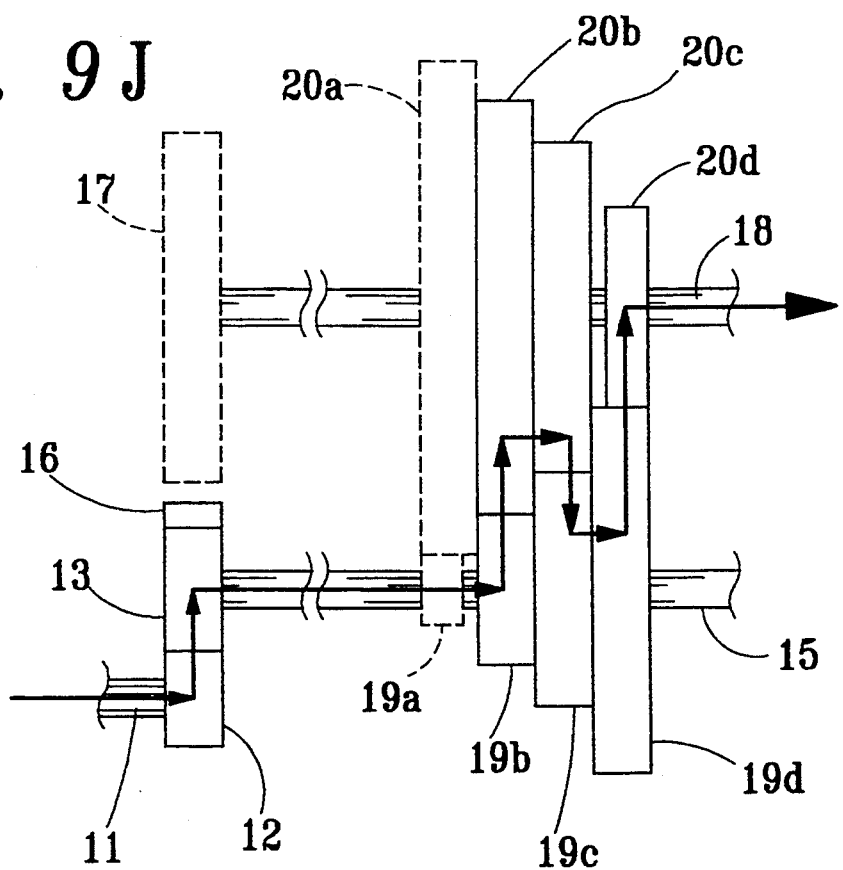
Figure 10A:
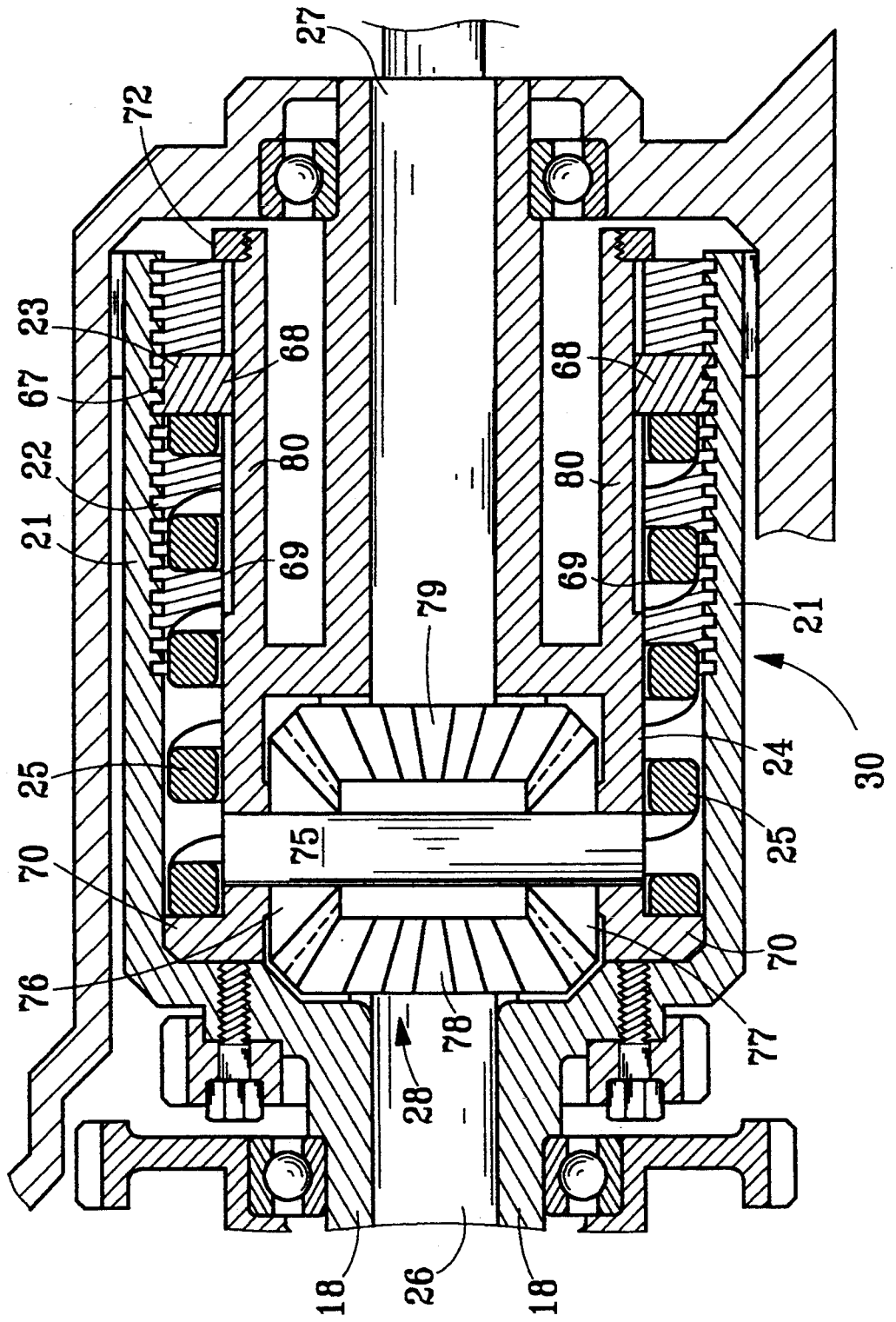
FIG. 10A is an enlarged sectional view of the differential and torque adjusting means of the transmission system of the present invention.
Figure 10:
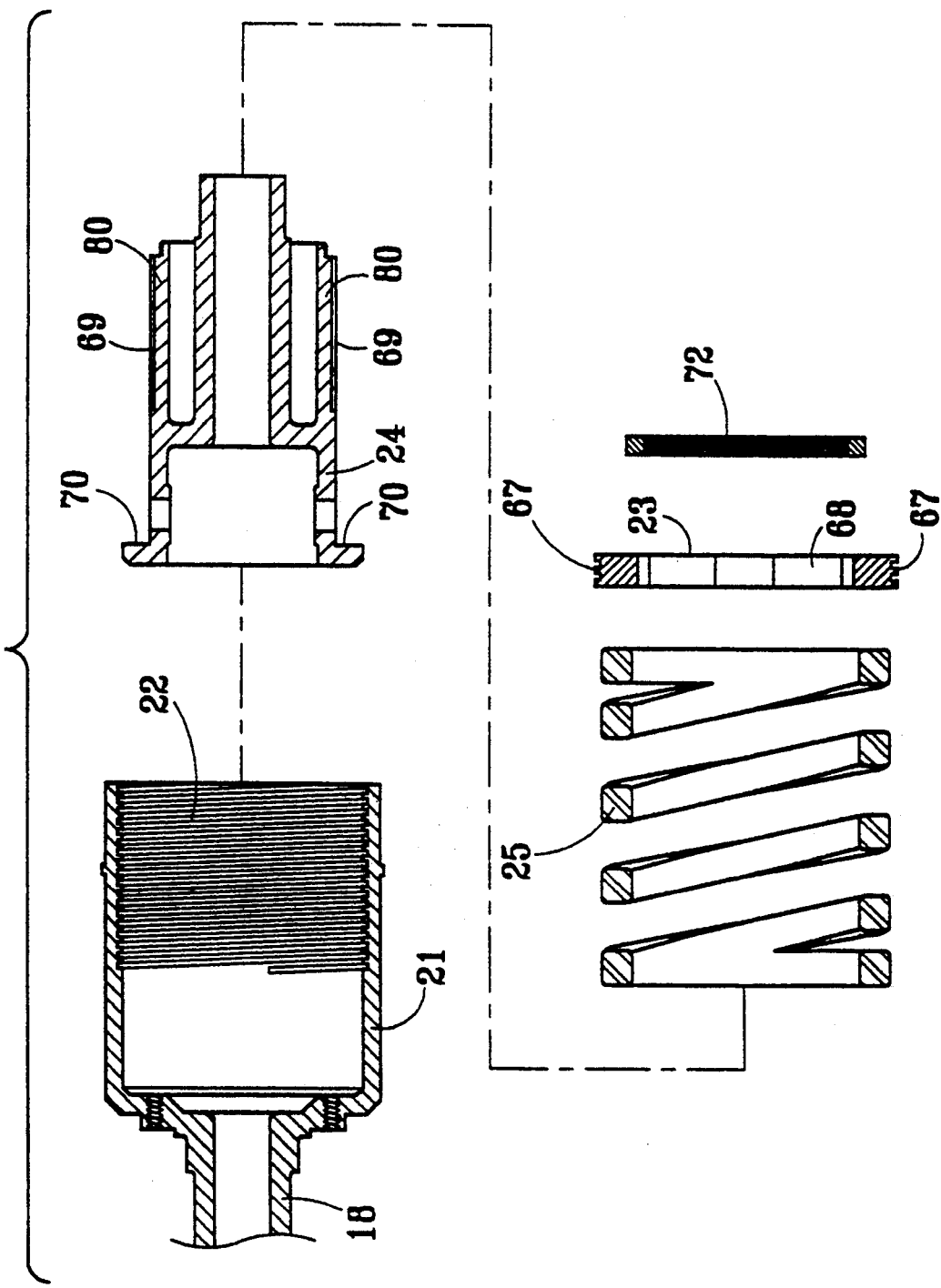
FIG. 10B is an exploded view of the differential and torque adjusting means.
FIG. 10C is an enlarged side view of the differential housing in FIG. 10B.
FIG. 10D is an enlarged side view of the torque adjusting ring in FIG. 10B.
Figure 10C:
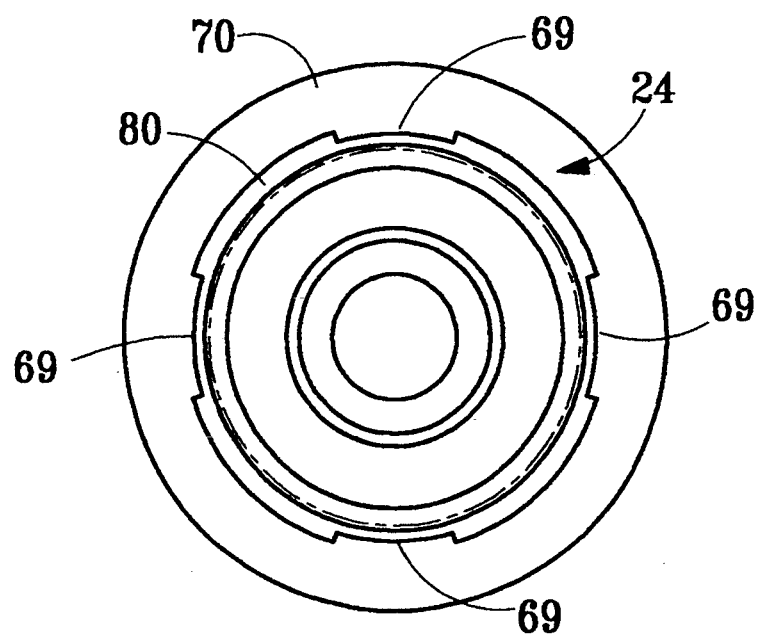
Figure 10D:
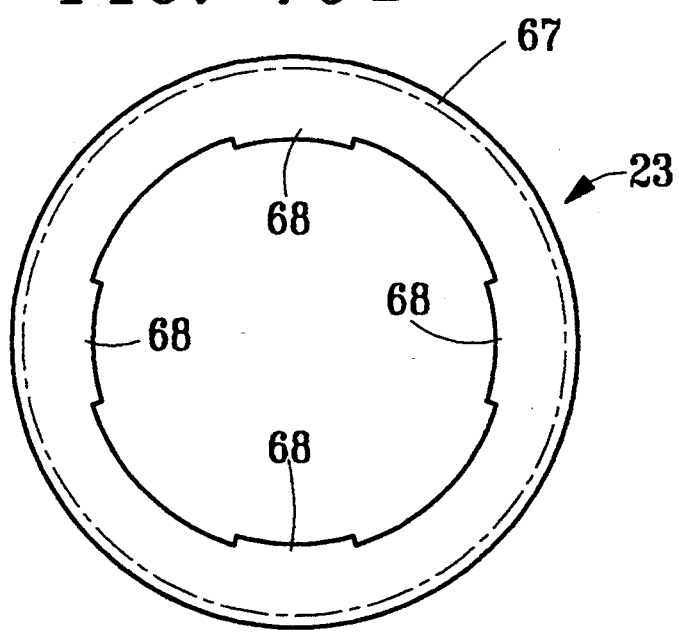

Please refer to FIGS. 8H and 9H. When the first and second controlling rotary disks 50 and 56 are further rotated to such a position where the fifth rod members 49e is located on the relatively high surface 57 of the second rotary disk 56 and the first to fourth rod members 49a to 49d respectively enter the first to fourth guide slots 51a to 51d, the idler 16 is separated from the backward gear 17, while the driven reducing gear 13 is engaged with the driving shaft 15, the driving shaft 15 is engaged with the second driving gear 19b, the second driving gear 19b is engaged with the third driving gear 19c and the third driving gear 19c is engaged with the fourth driving gear 19d, so that the power of the driven reducing gear 13 is transmitted to the driven shaft 18 through the driving shaft 15, the second to fourth driving gears 19b to 19d and the fourth driven gear 20d which are engaged with one another and rotate at the same speed in sequence, whereby the car is able to run forward at the sixth speed level. During the power transmission at the sixth speed level, the first driving gear 19a and the first to third driven gears 20a to 20c are freely idling members.

Please refer to FIGS. 9I and 9J which show two selectable but not used power transmission path at different speed levels. The transmission ratios of the two not used speed levels are close to those of the used speed levels and thus the two speed levels are not used. If the present invention includes n forward transmission gear sets, then $2^{n-1}$ kinds of forward transmission ratios can be created. For example, if four forward transmission gear sets are provided, then 8 kinds of forward transmission ratios are obtained, and if five forward transmission gear sets are provided, then 16 kinds of forward transmission ratios are obtained. In contrast to the present invention, the conventional transmission system with n forward transmission gear sets can only obtain n kinds of forward transmission ratios. Therefore, according to the present invention, the selectable transmission ratios are increased in an equi-ratio progression of the number of the transmission gear sets so that more reasonable and optimal transmission ratios of different speed levels can be selected to achieve a more smooth torque output curve of the driven shaft. As a consequence, a car using the transmission system of the present invention has a power output ability much better than that of a car using the conventional transmission system.

Please refer to FIGS. 10A to 10D. The driven shaft 18 of the transmission mechanism of the present invention does not directly rotarily drive a differential as a conventional transmission, but indirectly rotarily drives the differential through a torque adjusting means 30 which first adjusts the output torque value. The torque adjusting means 30 mainly includes a housing 21 integrally connected with the driven shaft 18, a torque adjusting ring 23 and a spring 25. The housing 21 is formed with inner coil guide groove 22 and the torque adjusting ring 23 is formed with outer coil projection 67 corresponding to the coil guide groove 22, whereby when the housing 21 rotates along with the driven shaft 18, the torque adjusting ring 23 meshing with the coil guide groove 22 is driven to rotate synchronously with the housing 21 or linearly slide along the coil guide groove 22. The differential 28 is disposed in the housing 21 for driving two lateral car wheel shafts 26 and 27. The differential 28 can be conventional parachute gear differential, including a differential housing 24, a radial differential shaft 75 two ends of which are pivotally connected with the housing 24, two end parachute differential gears 76 and 77 respectively oppositely fixed on the radial shaft 75 near two ends thereof and two lateral parachute side gears 78 and 79 respectively fixed on end sections of the two lateral car wheel shafts 26 and 27 and engaged with the two end parachute differential gears 76 and 77. The differential 28 is characterized in that the housing 24 has an extending sleeve section 80 substantially as long as the housing 21 of the torque adjusting means. The sleeve section 80 is formed with several outer rectangular guide grooves 69 and the torque adjusting ring 23 is formed with several inner rectangular projections 68 corresponding to the guide grooves 69, whereby when the torque value of the torque adjusting ring 23 is less than the load on the housing 24 of the differential 28, the torque adjusting ring 23 can only linearly slide along the rectangular guide groove 69 relative to the housing 24. However, when the torque value of the torque adjusting ring 23 is greater than the load on the housing 24, the torque adjusting ring 23 stops linearly sliding and turns to drive the housing 24 to synchronously rotate therewith. The torque adjusting ring 23 is further connected with a free end of the spring 25 which is fitted outside the housing 24 of the differential 28. The other end of the spring 25 is fixed on a projecting spring seat 70 of the housing 24, whereby when the torque adjusting ring 23 is forced to linearly slide relative to the housing 24, the torque adjusting ring 23 simultaneously compresses or extends the spring 25, making the same create a reaction force against the linearly sliding movement of the torque adjusting ring 23. When the force making the torque adjusting ring 23 linearly slide and the reaction force of the spring 25 come to a balance state, the torque adjusting ring 23 immediately stops linearly sliding. Moreover, a stopper ring 72 is engaged with a rear end of the housing 24 of the differential 28 for preventing the torque adjusting ring 23 from slipping outside.

In the instant that the housing 21 of the torque adjusting means is driven by the driven shaft 18 to initially rotate and the housing 24 of the differential 28 is not yet rotated along therewith, the torque adjusting ring 23 disposed therebetween is forced to linearly slide along the coil guide groove 22 due to the different torque values at the ends until the force making the torque adjusting ring 23 linearly slide and the gradually increasing reaction force of the spring 25 come to a balance state. At this time, the torque adjusting ring 23 immediately stops linearly sliding and turns to drive the housing 24 to synchronously rotate with the housing 21 and torque adjusting ring 23. Therefore, before driving the housing 24 of the differential 28 to start rotating, the housing 21 of the torque adjusting means previously stores a greater torque so that when the car starts to run, the car wheel shafts 26 and 27 obtain a greater initial torque. In addition, in the instant that the transmission mechanism changes the transmission ratios, the torque value of the housing 21 of the torque adjusting means is changed and thus the balance state of the torque adjusting ring 23 is changed to make the torque adjusting ring 23 again linearly move to another balance position. This reduces the vibration of the engine and car body during transmission and helps in the torque output performance of the engine during transmission.

In conclusion, the transmission system of the present invention includes a fully meshing gear type transmission mechanism with the characters of one-way transmission and differential transmission, whereby without the clutching operation of a clutch, the gear lever is operated to directly accomplish the transmission between the transmission gear sets. The transmission mechanism also possesses both the better transmission efficiency of the gear transmission and the operational convenience as achieved by an automatic transmission case. A set of controlling circuit and spiral wheels can be directly added to the transmission mechanism without replacing any parts so as to achieve a function of automatic transmission. The selectable transmission ratios are increased in an equi-ratio progression of the number of the transmission gear sets so that more reasonable and optimal transmission ratios of different speed levels can be selected to achieve a more smooth torque output curve of the driven shaft. Moreover, the transmission system of the present invention further includes a torque adjusting means, whereby when the car starts to run, the car wheel shafts obtain a greater initial torque and the vibration of the engine and car body during transmission is reduced.

It is to be understood that the above description and drawings are only used for illustrating one embodiment of the present invention, not intended to limit the scope thereof. Any variation and derivation from the above description and drawings should be included in the scope of the present invention.

What is claimed is:

1. A transmission system, comprising:
   a power source;
   a transmission mechanism including a driving shaft driven by said power source, a driven shaft driven by said driving shaft at different transmission ratios, several sets of driving gears which have increasing numbers of teeth and are sequentially inter-fitted on said driving shaft from inner side to outer side at intervals, and several sets of driven gears which have decreasing numbers of teeth and are sequentially inter-fitted on said driven shaft from outer side to inner side at intervals, said driven gears being constantly engaged with said driving gears corresponding therewith, each of said driving gears and driven gears having an axially extending sleeve section, plural detachable transmission spring members being disposed between said driving shaft and said extending sleeve sections of adjacent driving gears, said transmission spring members being respectively reciprocally independently moved between an engaging position where the power is transmitted and a disengaging position where the power is not transmitted, whereby the power of the driving shaft is sequentially transmitted to the most outward driving gear or the power transmission path is interrupted at any of said driving gears, plural one-way coil spring transmission members being disposed between adjacent driven gears and said driven shaft for sequentially transmitting power of said driven gears to said driven shaft and allowing an inward driven gear to rotate at a speed not lower than that of an outward driven gear;
   a transmission controlling assembly which is able to respectively independently make said detachable transmission spring members move between said engaging position and said disengaging position;
   a running mode controlling device which is manually operable to switch between a forward running mode in which the power created by said power source is solely transmitted to said driving shaft, a backward running mode in which the power created by said power source is solely transmitted to said driven shaft through an idler and a backward gear, and an idling mode in which the power is not transmitted;
   a differential including a housing having an extending sleeve section which is formed with plural outer rectangular guide grooves; and
   a torque adjusting means including a housing which rotates synchronously with said driven shaft, a torque adjusting ring and a spring, said housing being substantially as long as said extending sleeve section of said differential and formed with an inner coil guide groove, said torque adjusting ring being disposed between said housing and said extending sleeve section and formed with several outer coil projections corresponding to said coil guide groove and several inner rectangular projections corresponding to said rectangular guide grooves, said spring being disposed between said housing of said torque adjusting means and said extending sleeve section, having a fixed end and a free end abutting against said torque adjusting ring, whereby when said housing of said torque adjusting means rotates along with said driven shaft and the torque value of said torque adjusting ring is unequal to the load on said housing of said differential, said torque adjusting ring is forced to linearly slide along said rectangular guide grooves, and during the linearly sliding movement, said spring abutting against said torque adjusting ring exerts a gradually increasing reaction force thereon against the linearly sliding movement until said torque adjusting ring stops linearly sliding and turns to rotate synchronously with said housing of said torque adjusting means for further driving said housing of said differential to rotate synchronously.

2. A transmission system as claimed in claim 1, wherein said detachable transmission spring member disposed between said driving shaft and said extending sleeve sections of adjacent driving gears is substantially an integrally molded coil spring, including plural loops and a first and a second connecting end sections respectively extending toward two ends thereof, wherein said first connecting end section is directly fixed on said extending sleeve section of an outward driving gear, making said transmission spring member engage with said outward driving gear and rotate synchronously therewith, said second connecting end section being formed with a conic inner surface and able to be driven by said transmission controlling assembly to reciprocally move between said engaging position and disengaging position, whereby when said second connecting end section is moved to said engaging position, said conic inner surface thereof closely engages with a conic transmission sleeve fixed on an inward driving gear so as to make said transmission spring member engage with said inward driving gear and rotate synchronously therewith, while when said second connecting end section is moved to said disengaging position, said inner conic surface thereof is separated from said conic transmission sleeve, making said transmission spring member separate from said inward driving gear without transmitting power.

3. A transmission system as claimed in claim 1, wherein said transmission controlling assembly includes plural controlling pushing sleeves for respectively independently pushing said detachable transmission spring members, plural pushing rods for respectively abutting against said controlling pushing sleeves, plural springs for respectively exerting resilient force on said controlling pushing sleeves, a controlling rotary disk formed with plural continuous and discontinuous guide slots for respective pushing rods to extend thereinto, and a manually operated gear lever for rotating said controlling rotary disk, whereby when said pushing rod extends into a corresponding guide slot, said controlling pushing sleeve is forced by said spring to move to a position where said controlling pushing sleeve does not contact with said detachable transmission spring member, so as to make said detachable transmission spring member located at said engaging position for transmitting power, while said pushing rod is separated from said corresponding guide slot, said pushing rod through said controlling pushing sleeve pushes said detachable transmission spring member to said disengaging position where the power is not transmitted, and when said controlling rotary disk is rotated through a certain angle by said manually operated gear lever, the relationship between respective pushing rods and guide slots is changed.

4. A transmission system as claimed in claim 1, wherein said transmission controlling assembly includes plural controlling pushing sleeves for respectively independently pushing said detachable transmission spring members, plural pushing rods for respectively abutting against said controlling pushing sleeves, plural springs for respectively exerting resilient force on said controlling pushing sleeves, a spiral wheel formed with plural continuous and discontinuous guide slots for respective pushing rods to extend thereinto, and an electric spiral rod, whereby when said pushing rod extends into a corresponding guide slot, said controlling pushing sleeve is forced by said spring to move to a position where said controlling pushing sleeve does not contact with said detachable transmission spring member, so as to make said detachable transmission spring member located at said engaging position for transmitting power, while said pushing rod is separated from said corresponding guide slot, said pushing rod through said controlling pushing sleeve pushes said detachable transmission spring member to said disengaging position where the power is not transmitted, and when said spiral wheel is rotated through a certain angle by said spiral rod, the relationship between respective pushing rods and guide slots is changed.

5. A transmission system as claimed in claim 1, wherein said one-way coil spring transmission member disposed between said extending sleeve sections of adjacent driven gears and said driven shaft includes plural loops and a first and a second end sections, wherein said first end section is directly fixed on said extending sleeve section of an outward driven gear, making said coil spring transmission member engage with said outward driven gear and rotate synchronously therewith, said loop inward forcing said extending sleeve section of an inward driven gear so that the power of said outward driven gear is able to be transmitted through said loops to said inward driven gear, said second end section having a spring seat, a one-way bearing being clamped between said spring seat and said inward driven gear, the coil direction of said loops being such that said inward driven gear is allowed to rotate at a speed not lower than that of said outward driven gear.

6. A transmission system as claimed in claim 1, wherein said running mode controlling device includes:
- a reducing gear driven by said power source, said reducing gear having an axially extending sleeve section fitted around said driving shaft with a clearance defined therebetween;
- a detachable transmission spring member fitted between said driving shaft and said extending sleeve section of said reducing gear, said transmission spring member including a first connecting end section directly fixed on said extending sleeve section of said reducing gear and a second connecting end section having an inner conic surface;
- a conic transmission sleeve fixed on said driving shaft;
- a manually operated controlling pushing sleeve for pushing said second connecting end section, making the same reciprocally move between an engaging position where said second connecting end section closely engages with said conic transmission sleeve and a disengaging position where said second connecting end section is separated from said conic transmission sleeve;
- a pivoting member one end of which is pivotally connected with said extending sleeve section of said reducing gear and the other end of which extends downward, said pivoting member being disposed with a gear shaft for supporting said idler, whereby said idler is able to swing along with said pivoting member while constantly meshing with said reducing gear; and
- a manually operated wedge slide block abutting against said other end of said pivoting member, said wedge slide block pushing said pivoting member to reciprocally swing between a first position where said idler is engaged with said backward gear and a second position where said idler is separated from said backward gear.

* * * * *